United States Patent
Miyano et al.

(10) Patent No.: US 7,353,012 B2
(45) Date of Patent: Apr. 1, 2008

(54) WIRELESS COMMUNICATION EQUIPMENT AND WIRELESS COMMUNICATION METHOD

(75) Inventors: Kentaro Miyano, Kanagawa (JP); Junji Sato, Tokyo (JP)

(73) Assignee: Matsushita Electric Indutrial Co., Ltd., Osaka (JP)

( * ) Notice: Subject to any disclaimer, the term of this patent is extended or adjusted under 35 U.S.C. 154(b) by 93 days.

(21) Appl. No.: 10/570,859

(22) PCT Filed: Mar. 8, 2005

(86) PCT No.: PCT/JP2005/003944

§ 371 (c)(1),
(2), (4) Date: Mar. 7, 2006

(87) PCT Pub. No.: WO2005/089005

PCT Pub. Date: Sep. 22, 2005

(65) Prior Publication Data

US 2007/0026827 A1 Feb. 1, 2007

(30) Foreign Application Priority Data

Mar. 12, 2004 (JP) .............................. 2004-070451
Mar. 3, 2005 (JP) .............................. 2005-058565

(51) Int. Cl.
*H04B 1/06* (2006.01)
*H04B 7/00* (2006.01)

(52) U.S. Cl. .................... 455/277.1; 455/334; 455/140

(58) Field of Classification Search ................ 455/132, 455/133, 134, 135, 140, 226.1, 226.2–226.3, 455/234.1–234.2, 277.1–277.2, 269, 272, 455/334, 552.1, 553.1
See application file for complete search history.

(56) References Cited

U.S. PATENT DOCUMENTS 6,018,651 A * 1/2000 Bruckert et al. ......... 455/277.1

FOREIGN PATENT DOCUMENTS

| JP | 2-168745 A | 6/1990 |
|---|---|---|
| JP | 9-181660 A | 7/1997 |
| JP | 10-042336 | 2/1998 |
| JP | 11-284554 A | 10/1999 |
| JP | 2000-332665 A | 11/2000 |

(Continued)

OTHER PUBLICATIONS

International Search Report for PCT/JP2005/003944, dated May 17, 2005.

*Primary Examiner*—Edward F. Urban
*Assistant Examiner*—Christian A. Hannon
(74) *Attorney, Agent, or Firm*—RatnerPrestia

(57) ABSTRACT

If it is judged by a signal from a first signal processing unit that a signal of a first communication system is not received and it is judged by a signal from a second signal processing unit that a signal of a second communication system is received, wireless communication is performed by the second communication system. If it is judged that the signals of the first and the second communication systems are received, a system judging unit judges which communication system is to be used for the wireless communication, based on the signals from the first signal processing unit and the second signal processing unit. If the wireless communication is to be performed by the first communication system, diversity reception or transmission is performed by first and second antenna elements.

16 Claims, 18 Drawing Sheets

FOREIGN PATENT DOCUMENTS

| | | |
|---|---|---|
| JP | 2001-127850 | 5/2001 |
| JP | 2001-177870 A | 6/2001 |
| JP | 2002-171568 A | 6/2002 |
| JP | 2002-237764 | 8/2002 |
| JP | 2003-32177 A | 1/2003 |
| JP | 2003-169008 A | 6/2003 |
| JP | 2003-188759 A | 7/2003 |
| JP | 2004-23536 A | 1/2004 |
| WO | WO 01/50636 A1 | 7/2001 |

\* cited by examiner

WIRELESS COMMUNICATION EQUIPMENT AND WIRELESS COMMUNICATION METHOD

This application is a U.S. national phase application of PCT International Application PCT/JP2005/003944.

TECHNICAL FIELD

The invention relates to a wireless communication equipment and a wireless communication method, which comply with services of plural wireless systems using plural antennas.

BACKGROUND ART

Conventionally, as measures for fading in a wireless communication equipment, a diversity in which a whip antenna 102 and an internal antenna 103 housed in a casing 101 are switched as shown in FIG. 17 is often used in the case of a PDC (Personal Digital Cellular) system. However, in a W-CDMA (Wideband Code Division Multiple Access) system, since a path-diversity by a RAKE reception is performed, the wireless communication equipment has one antenna.

The wireless communication equipment complied with one wireless communication system conventionally, however, not only a mobile phone but also other wireless communication systems such as a wireless LAN are prevailing, therefore, a wireless communication equipment complying with plural wireless communication systems is required.

As a wireless communication equipment which switches an antenna element to be used depending on the wireless communication system to be used, for example, a wireless communication equipment and a wireless communication method are disclosed, which can automatically select a function to be actually executed in functions included in the wireless communication equipment of itself based on an extension state of the antenna element in the case that the equipment has a wireless communication system using plural antenna elements by switching them and a wireless communication system performing the wireless communication by using a part of these plural antenna elements (for example, refer to JP-A-2003-32177).

In a pamphlet of International Publication WO01-050636, a dual-mode mobile phone in a diversity system which can be used both in the W-CDMA system and the PDC system is disclosed.

FIG. 18 is a block diagram showing a configuration of the dual-mode mobile phone.

In FIG. 18, the dual-mode mobile phone includes a transmission and reception antenna 1501, a reception antenna 1502, a transmission circuit 1511 and a reception circuit 1512 of the W-CDMA system, a transmission circuit 1513 and a reception circuit 1514 of the PDC system, switches SW1 to SW3 for connecting the antennas 1501, 1502 to the circuits 1511, 1512 of the W-CDMA system, or to the circuits 1513, 1514 of the PDC system selectively, and a band separator 1503. At the time of monitoring when communicating in the PDC system, by conducting between T2a and T3a by the SW1, the reception circuit 1512 of the W-CDMA system monitors information from a base station of the W-CDMA system based on signals received by the antenna 1501 and the antenna 1502. At the time of monitoring when communicating in the W-CDMA system, by conducting between T1a and T3a by the SW1 and conducting between T2b and T3b by the SW2, the reception circuit 1514 of the PDC system monitors information from a base station of the PDC system based on signals received by the antenna 1501 and the antenna 1502. When the level of signals currently received becomes low, the system can be shifted to the other system quickly.

However, in the conventional wireless communication equipment and the wireless communication method written in JP-A-2003-32177, whether the plural antenna elements are used or a part of the plural antenna elements is used are switched based on the extension state of the antenna element, therefore, there was a problem that the user had to extend or house the antenna element depending on the wireless communication system.

In the conventional wireless communication equipment and the wireless communication method written in the pamphlet of International Publication WO01-050636, there was a problem that, at the time of monitoring the other communication system during the communication in one communication system, transmission could not be performed with respect to the communication system to be monitored.

DISCLOSURE OF THE INVENTION

An object of the invention is to provide a wireless communication equipment and a wireless communication method capable of switching between the communication performed using plural antenna elements and the communication performed not using plural antenna elements in accordance with a communication system, not depending on a extension state of the antenna element automatically and at any time, and also capable of performing transmission and reception with respect to the communication system to be monitored.

The wireless communication equipment of the invention includes a first antenna element and a second antenna element receiving wireless signals, a first signal processing part performing reception processing of a first wireless signal in a first communication system received by at least one of the first antenna element and the second antenna element, a second signal processing part performing reception processing of a second wireless signal in a second communication system received by any one of the first antenna element and the second antenna element, a system judging part judging which of the first communication system or the second communication system is used for communication based on respective output signals from the first signal processing part and the second signal processing part and a switching judging part judging a switching between the communication by the first antenna element and the communication by the second antenna element, in which the switching judging part, when receiving a notification of selecting the first communication system from the system judging part, performs a diversity by the first antenna element and the second antenna element, and when receiving a notification of selecting the second communication system, performs wireless communication in the first antenna element or the second antenna element.

According to the configuration, the system used for communication can be automatically switched between the communication system using plural antenna elements and the communication system not using plural antenna elements in accordance with the receiving status, and the antenna elements used for communication can be automatically switched in accordance with the system to be used for communication.

The wireless communication equipment of the invention also includes an antenna switching part outputting at least one of a reception signal from the first antenna element and a reception signal from the second antenna element to the first signal processing part based on a switching instruction from the switching judging part. According to this, the diversity which switches the antenna element can be performed.

In the wireless communication equipment, the first communication system is a system performing the diversity by plural antenna elements such as a PDC system, and the second communication system is a system not performing the diversity by plural antenna elements such as a W-CDMA system or a GSM system. According to this, a switching between the system using plural antenna elements and the system not using plural antenna elements becomes possible.

The wireless communication equipment of the invention further includes a system switching part switching a connecting destination of the first antenna element to any one of the first signal processing part and the second signal processing part, performing the diversity by the first antenna element and the second antenna element, and when the system judging part detects an idle period of the first communication system, the system judging part outputs a instruction to the system switching part, which changes the connecting destination of the first antenna element to the second signal processing part, and also judges whether switching to the second communication system based on the output signal from the second signal processing part.

According to the configuration, the receiving status of the second communication system can be detected while performing the communication in the first communication system, and when the receiving status of the second communication system is judged to be better, the communication system can be switched.

In the wireless communication equipment, the system judging part prohibits the first signal processing part from performing communication after the system judging part detects the idle period and instructs the system switching part to change to the second signal processing part until finishing the judgment whether switching to the second communication system.

According to this, it can be positively prevented that the communication in the first communication system is performed during the detection of the receiving status in the second communication system.

The wireless communication equipment includes a synchronous timing detecting part detecting the timing when the first signal processing part and the second signal processing part are synchronized, in which the system judging part, when switching from the first communication system to the second communication system, outputs an instruction to the system switching part, which changes a connecting destination of the first antenna element to the first signal processing part at the timing when not performing the communication for establishing a wireless link using the second communication system, until the synchronous timing detecting part detects the timing when receiving a notification informing the establishment of the wireless link from a base station using the second communication system to perform the communication by the diversity using the first communication system.

According to this, the first signal processing part can start monitoring the receiving status in the second communication system while performing the communication.

In the wireless equipment of the invention, when the second communication system is the W-CDMA system, the system judging part prohibits the first signal processing part from performing communication during a cell search period for establishing the wireless link by the second signal processing part.

According to this, the cell search in the W-CDMA system can be maintained even after the idle period of the first communication system, therefore, the cell search can be positively performed in a short time.

The wireless communication equipment of the invention also includes a display part displaying receiving statuses of the first communication system and the second communication system by the system judging part, and an user input part by which a user can operate power supplies of the first signal processing part and the second signal processing part depending on the receiving statuses.

According to the configuration, power supplies of the wireless communication equipment can be operated manually based on the display content, as a result, power consumption of the wireless communication equipment can be reduced by the judgment of the user.

A wireless communication method of the invention includes a step of performing a diversity in a first communication system using a first antenna element and a second antenna element, a step of monitoring a receiving status in a second communication system by the first antenna element during an idle period of the first communication system, and a step of finishing the first communication system and switching to the second communication system when detecting the receiving status in the second communication system, which is better than the receiving status in the first communication system.

According to this, the system to be used for communication can be automatically switched between the communication system using plural antenna elements and the communication system not using plural antenna elements depending on the receiving status, and the antenna element to be used for communication can be automatically switched depending on the system used for communication.

The wireless communication method of the invention also includes a step of monitoring the receiving status in the first communication system by the second antenna element at the same time, after switching to the communication in the second communication system.

According to this, it becomes possible to monitor the first communication system without affecting the second signal processing part at all.

In the wireless communication method of the invention, the first communication system is a system performing the diversity by plural antenna elements such as a PDC system, and the second communication system is a system not performing the diversity by plural antenna elements such as a W-CDMA system or a GSM system.

According to this, it becomes possible that the switching between the system using plural antenna elements and the system not using plural antenna elements.

In the wireless communication method of the invention, the receiving status is the reception signal strength, BER (Bit Error Rate), a throughput, SNR (Signal to Noise Ratio) or CNR (Carrier to Noise Ratio). According to these, the receiving status can be detected quantitatively.

The wireless communication method of the invention also includes a step of prohibiting the communication in the first communication system when performing the communication in the second communication system during the idle period of the first communication system.

According to this, the communication in the first communication system during detection of the receiving status in the second communication system can be positively prevented.

The wireless communication method of the invention also includes, when monitoring the receiving status in the second communication system which is the W-CDMA system, a step of prohibiting the communication in the first communication system in a cell search period.

According to this, the cell search in the W-CDMA system can be maintained after the idle period in the first communication system, therefore, the cell search can be positively performed in a short time.

The wireless communication method of the invention also includes a step of detecting the idle period of the first communication system and transmitting a RACH (Random Access Channel) in the second communication system to a base station and a step of interrupting the monitor for the second communication system and returning to the first communication system after the response time with respect to the RACH from the base station, in which these steps are repeated until receiving an AI (Acquisition Indicator) from the base station.

According to this, in the period of establishing a wireless link to the base station, which is performed for monitoring the receiving status in the W-CDMA system, the communication in the first signal processing part can be maintained.

According to the invention, it is possible to switch between the communication using plural antenna elements and the communication performed not using plural antenna elements in accordance with the communication system automatically and at any time, without requiring a detecting means of the extension state of the antenna elements. Further, it becomes possible to perform transmission and reception in the communication of the communication system to be monitored.

DESCRIPTION OF REFERENCE NUMERALS

Figure 1:
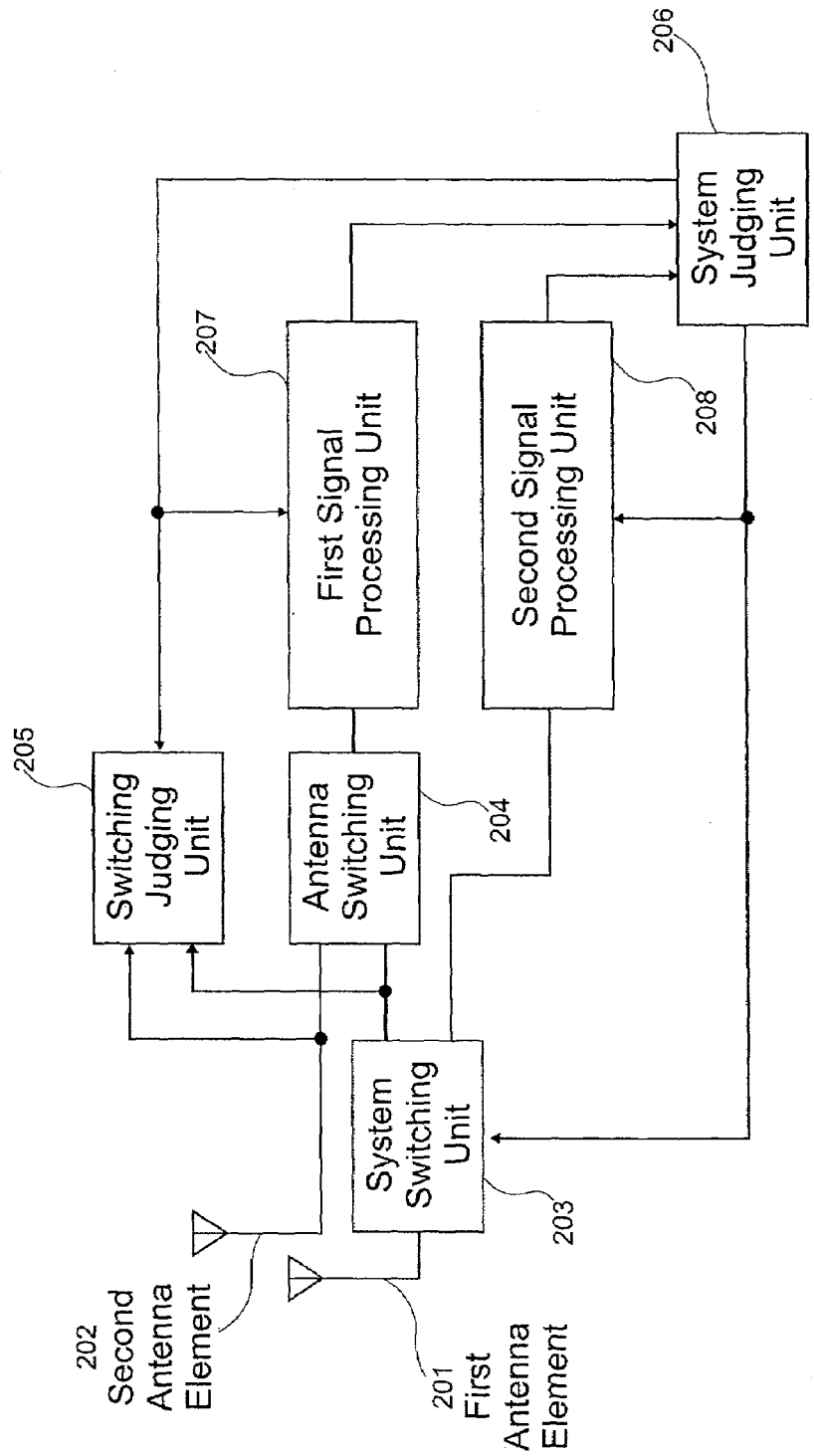
FIG. 1 is a block diagram showing a configuration of a wireless communication equipment according to a first embodiment of the invention.

201 first antenna element
202 second antenna element
203, 403 system switching unit
204, 304 antenna switching unit
205, 305, 405 switching judging unit
206, 306, 406 system judging unit
207, 209, 210 first signal processing unit
208 second signal processing unit
611 display unit
612 user input unit
701 synchronous timing detecting unit
712 beam forming unit
1301, 1302 power supply switch

BEST MODE FOR CARRYING OUT THE INVENTION

Hereinafter, a wireless communication equipment and a wireless communication method according to embodiments of the invention will be explained with reference to the drawings.

Embodiment 1

FIG. 1 is a block diagram showing a configuration of a wireless communication equipment according to an embodiment 1 of the invention.

In FIG. 1, the wireless communication equipment includes a first antenna element 201, a second antenna element 202, a system switching unit 203 switching a communication system to be used between a first communication system and a second communication system, an antenna switching unit 204 switching an antenna element to be used with respect to the first communication system between the first antenna element 201 and the second antenna element 202, a switching judging unit 205 judging the switching of the antenna switching unit 204, a system judging unit 206 judging which of the first communication system or the second communication system is used for communication, a first signal processing unit 207 processing a signal of the first communication system and a second signal processing unit 208 processing a signal of the second communication system.

The first antenna element 201 is connected to the system switching unit 203, which transmits or receives an RF (Radio frequency) signal of the first communication system or the second communication system. The second antenna element 202 is connected to the antenna switching unit 204, which transmits or receives RF signals of the first communication system. The system switching unit 203 is connected to the system judging unit 206, which switches a connection destination of the first antenna element 201 to the second signal processing unit 208 or the antenna switching unit 204, depending on a signal inputted from the system judging unit 206. The antenna switching unit 204 is connected to the switching judging unit 205, which switches a connection destination of the first signal processing unit 207 to the second antenna element 202 or the system switching unit 203, depending on a signal inputted from the switching judging unit 205.

The first signal processing unit 207, when the RF signal of the first communication system is inputted from the antenna switching unit 204, performs a high-frequency processing, a carrier-wave processing, or a baseband processing, then, outputs an intermediate-frequency signal, a demodulation signal, or a decoded signal. The first signal processing unit 207, when the encoded signal, the modulation signal, or the intermediate-frequency signal are inputted, performs the baseband processing, the carrier-wave processing, or the high-frequency processing, then, outputs the RF signal of the first communication system to the antenna switching unit 204.

The second signal processing unit 208, when the RF signal of the second communication system is inputted from the system switching unit 203, performs the high-frequency processing, the carrier-wave processing, or the baseband processing, then, outputs the intermediate-frequency signal, the demodulation signal, or the decoded signal. The second signal processing unit 208, when the encoded signal, the modulation signal, or the intermediate-frequency signal are inputted, performs the baseband processing, the carrier-wave processing, or the high-frequency processing, then, outputs the RF signal of the second communication system to the system switching unit 203.

The system judging unit 206 is connected to the first signal processing unit 207 and the second signal processing unit 208, and judges which of the first communication system or the second communication system should be selected by comparing the reception signal strength, BER and the like in signals outputted from the first signal processing unit 207 and signals outputted from the second signal processing unit 208, then, outputs a signal for switching a connecting destination of the system switching unit 203 to the second signal processing unit 208 or the antenna switching unit 204. The system judging unit 206 also outputs a signal showing that the system switching unit 203 is connected to which unit to the switching judging unit 205.

The switching judging unit 205 knows that the system switching unit 203 is connected to which of the second signal processing unit 208 or the antenna switching unit 204 according to the signal inputted from the system judging unit 206. When the system switching unit 203 is connected to the antenna switching unit 204, the switching judging unit 205 judges which of the first antenna element or the second antenna element should be selected by comparing the reception signal strength, BER and the like in signals received at the first antenna element 201 and signals received at the second antenna element 202. Then, the switching judging unit 205 outputs a signal to the antenna switching unit 204, which switches a connecting destination of the first signal processing unit 207 to the system switching unit 203 (first antenna element 201) or the second antenna element 202.

In the embodiment, the first communication system is a PDC system in which a diversity by plural antenna elements is performed, and the second communication system is a W-CDMA system in which the diversity by plural antenna elements is not performed.

Operations of the wireless communication equipment constituted as the above will be explained with reference to FIG. 2.

Figure 2:
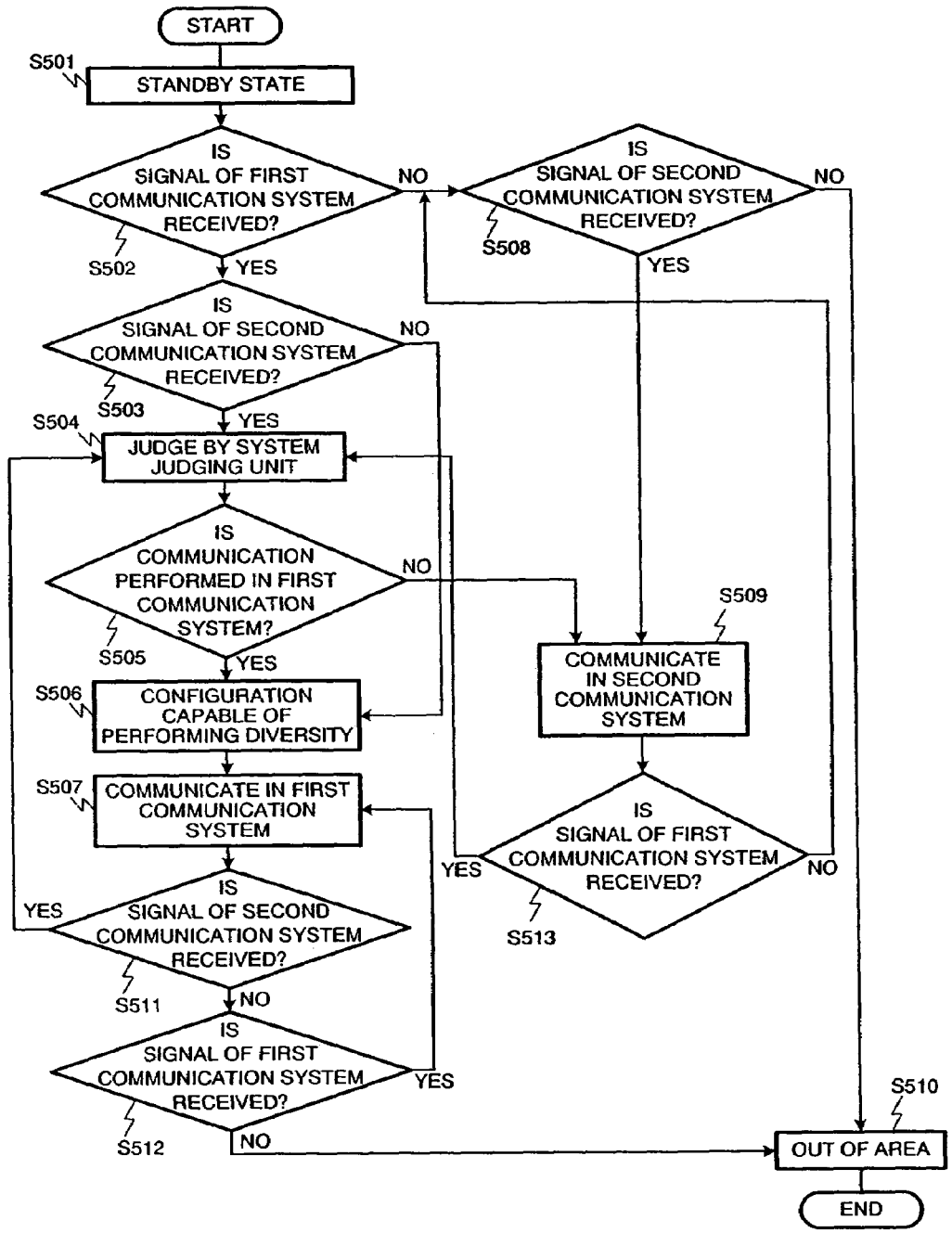
FIG. 2 is a flow chart showing operations of the wireless communication equipment according to the first embodiment of the invention.

FIG. 2 is a flow chart showing operations of the wireless communication equipment according to the embodiment 1 of the invention.

When the wireless communication equipment is in a standby state, the system switching unit 203 and the switching judging unit 205 are controlled by the system judging unit 206, the first antenna element 201 is connected to the second signal processing unit 208, and the second antenna element 202 is connected to the first signal processing unit 207. According to this, the system judging unit 206 enables the wireless communication equipment to receive both signals of the first communication system and the second communication system (step S501).

Next, the system judging unit 206 judges whether a signal of the first communication system is received based on the signal outputted from the first signal processing unit 207 (step S502). When the judged result of the step S502 is "NO", whether a signal of the second communication system is received is judged based on the signal outputted from the second signal processing unit 208 (step S508). When the judged result of the step S508 is "NO", the system judging unit 206 judges that the wireless communication equipment is located out of area with respect to both communication systems (step S510), and the process ends.

When the judged result of the step S508 is "YES", the system judging unit 206 judges that communication can be possible only in the second communication system and the wireless communication equipment performs communication in the second communication system (step S509).

When the judged result of the step S502 is "YES", the system judging unit 206 judges whether a signal of the second communication system is received based on the signal outputted from the second signal processing unit 208 (step S503).

When the judged result is "NO", the system judging unit 206 judges that communication can be possible only in the first communication system, and the process proceeds to step S506.

When the judged result S503 is "YES", the system judging unit 206 judges which of the first communication system or the second communication system is used for communication based on the signals outputted from the first signal processing unit 207 and the second signal processing unit 208 (step S504). The judgment is performed based on a receiving status of the first communication system and the second communication system. When the system judging unit 206 judges that the communication is performed in the first communication system ("YES" of the step S505), the system judging unit 206 controls the system switching unit 203 to switch a connecting destination of the first antenna element 201 to the antenna switching unit 204, which enables a diversity reception or transmission using the first antenna element 201 and the second antenna element 202 (step S506). Then, the wireless communication equipment performs communication in the first communication system (step S507).

As the receiving status, the reception signal strength, BER (Bit Error Rate), a throughput, SNR (Signal to Noise Ratio) or CNR (Carrier to Noise Ratio) and the like in the signal outputted from the first signal processing unit 207 and the second signal processing unit 208 are used. For example, when performing communication requiring the fixed communication speed or the real-time property such as calls by voice, the system judging unit 206 selects the communication system of which BER characteristic is better, and when performing communication in which the communication speed varies or not requiring the real-time property such as data communication, the communication system having a high throughput is selected. In the case there is not enough battery, a method of switching to a communication system with less power consumption or a method of switching to a toll-free communication system is possible.

In the step S507, when performing the diversity with respect to the first communication system, the switching judging unit 205 judges which of the first antenna element 201 or the second antenna element 202 is used for communication by comparing the reception signal strength, BER and the like in signals received at the first antenna element 201 and the second antenna element 202.

In step S505, when the system judging unit 206 judges that communication is performed by the second communication system ("NO" in the step S505), the wireless communication equipment performs communication in the second communication system (step S509).

Next, when communication is performed in the first communication system (step S507), the system judging unit 206 controls the system switching unit 203 and the switching judging unit 205 to switch a connecting destination of the first antenna element 201 to the second signal processing unit 208 intermittently. The system judging unit 206 judges whether receiving a signal of the second communication system based on the signal outputted from the second signal processing unit 208 (step S511). When the judged result of the step S511 is "YES", the process returns to the step S504, the system judging unit 206 judges whether the communication in the first communication system is maintained or whether switching to the second communication system based on the receiving status of the first communication system and the second communication system.

When the judged result of the step S511 is "NO", the system judging unit 206 judges whether receiving a signal of the first communication system based on the signal outputted from the first signal processing unit 207 (step S512). When the judged result of the step S512 is "YES", the process returns to the step S507 and the communication in the first communication system is maintained. When the judged result of the step S512 is "NO", the system judging unit 206 judges that the wireless communication equipment is located out of area with respect to both communication systems (step S510), and the process ends.

When the wireless communication is performed in the second communication system (step S509), the system judging unit 206 judges whether receiving a signal of the first communication system based on the signal outputted from first signal processing unit 207 (step S513). When the judged result of the step S513 is "YES", the process returns to the step S504, and the system judging unit 206 judges whether the communication in the second communication system is maintained or whether switching to the first communication system based on the receiving status of the first communication system and the second communication system.

When the judged result of the step S513 is "NO", the process returns to step S508, and the system judging unit 206 judges whether receiving a signal of the second communication system based on the signal outputted from the second signal processing unit 208 (step S508).

It is also possible that the process starts from the detection of the receiving status of a signal of the second communication system during the standby state of the step S501. When the judged result of the step S511 is "NO", it is possible that the process directly returns to the step S507 and the communication in the first communication system is maintained. When the judged result of the step S513 is "NO", it is possible that the process directly returns to the step S509 and the communication in the second communication system is maintained.

A method of monitoring the signal of the second communication system by switching a connecting destination of the first antenna element 201 to the second signal processing unit 208 intermittently in the step S511 will be explained as follows.

Figure 14:
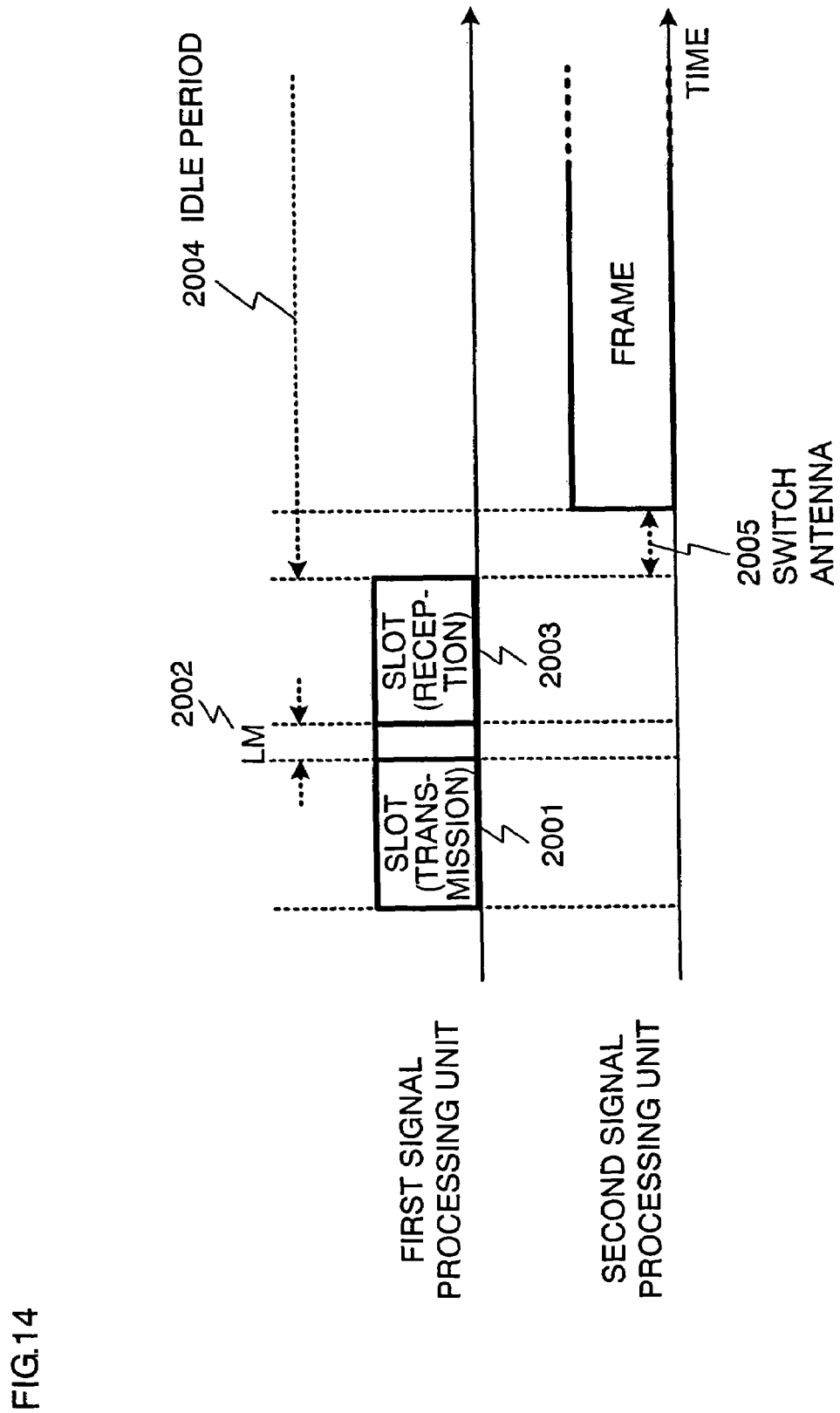
FIG. 14 is a timing chart showing a communication operation of the wireless communication equipment according to the first embodiment of the invention.

FIG. 14 is a view showing the timing when the first signal processing unit 207 and the second signal processing unit 208 transmit or receive signals when the communication in the first communication system is interrupted or ended, and the establishment of a wireless link in the second communication system is started to confirm the receiving status of the second communication system.

The PDC system, after a transmission slot 2001, sets a reception signal level measuring signal 2002 (LM) for performing the diversity and comes to an idle period 2004 (Idle), passing through a receiving slot 2003. During the idle period 2004, the connecting destination of the first antenna element is switched to the second signal processing unit 208 after an antenna switching period 2005, and the establishment of the wireless link is started in the second communication system.

When the wireless communication equipment establishes the wireless link to a base station in the W-CDMA system, the system is basically asynchronous between base stations, therefore, it is necessary that the equipment performs a cell search at first to establish a down-link and establish an up-link by a RACH (Random Access Channel) secondly. However, when the wireless communication equipment exists in a communication area of the W-CDMA system, it is considered that the down-link is established, and the case in which the process is started from the establishment of the up-link is explained.

Figure 10:
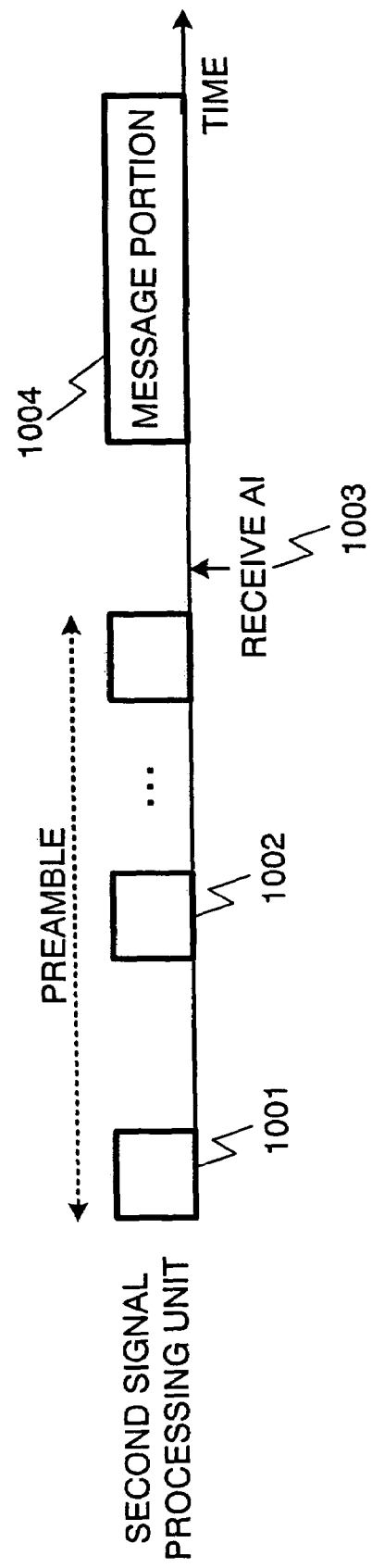
FIG. 10 is a timing chart showing a W-CDMA communication operation of the wireless communication equipment of the first embodiment of the invention.

FIG. 10 is a timing chart showing an operation when the establishment of the up-link to the base station by the W-CDMA system is started. In the W-CDMA system, a physical channel corresponding to RACH is PRACH (Physical Random Access Channel). The wireless communication equipment transmits preambles of PRACH plural times intermittently until receiving an AI (Acquisition Indicator) on an AICH (Acquisition Indicator Channel) which indicates the detection of preambles from the base station. The wireless communication equipment, when receiving the AI, transmits a message portion of PRACH to the base station to control for establishing the up-link.

As shown in FIG. 10, the second signal processing unit 208 starts a synchronous processing by transmitting a preamble 1001 of PRACH for establishing the up-link to the base station.

After that, the second signal processing unit 208 transmits a preamble 1002 of PRACH repeatedly. The preambles are transmitted plural times intermittently until receiving the AI on AICH indicating the detection of the preamble from the base station. The second signal processing unit 208, when receiving the AI (1003), transmits the message portion (1004) of PRACH to the base station to establish the up-link.

After that, the system judging unit 206 starts the confirmation of the receiving status of the second communication system.

When it is assured that the confirmation of the receiving status of the second communication system or the judgment of switching the communication system is completed during the time-divided idle period, the system judging unit 206 controls system switching unit 203 so as to switch a connecting destination of the first antenna element 201 from the antenna switching unit 204 to the second signal processing unit 208. The system judging unit 206 performs the confirmation of the receiving status of the second communication system or the judgment of switching the communication system during the idle period based on the signal from the second signal processing unit 208.

In the embodiment, the case in which the first communication system is the PDC system as one of TDMA/FDD systems is explained, however, it is not limited to this. It is possible that the connecting destination of the first antenna element 201 is switched from the antenna switching unit 204 to the second signal processing unit 208 intermittently by using the time-divided idle period in the same way as the PDC system, in the case of the TDMA/TDD system, that is, the time divided communication system such as a PHS (Personal Handy-phone System) system. When the first communication system is not the time-divided communication system, that is, a SS (Spread Spectrum) system such as IEEE802.11b, or an OFDM (Orthogonal Frequency Division Multiplexing) system such as IEEE802.11a, it is possible that the connecting destination of the first antenna element 201 is switched from the antenna switching unit 204 to the second signal processing unit 208 intermittently by using the idle period of communication.

If there is a possibility that the confirmation of the receiving status in the second communication system or the judgment of switching the communication system can not be processed within the idle period of the first communication system, the system judging unit 206 controls the first signal processing unit 207 so as not to perform communication in the first communication system before the establishment of the wireless link in the second communication system is started. For example, when the first communication system is IEEE802.11a, the system judging unit 206 controls the first signal processing unit 207 not to perform the carrier sense after the second signal processing unit 208 starts the establishment of the wireless link to the base station of the second wireless system. In this case, the system switching unit 203 switches the connecting destination of the first antenna element 201 from the antenna switching unit 204 to the second signal processing unit 208 by the control of the system judging unit 206. The second signal processing unit 208, after establishing the wireless link to the base station, starts the communication in the second communication system and judges whether switching the communication system to the second communication system.

In the case that the system judging unit 206 judges that the communication system is not switched to the second communication system, the system judging unit 206 controls the first signal processing unit 207 to be able to perform the carrier sense at the time when the judgment is completed. Upon receipt of the control, the first signal processing unit 207 starts the carrier sense to continue communication in the first communication system.

When the communication in the first communication system requires the real-time property such as calls by voice and there is no vacant time, the system judging unit 206 can control the system switching unit 203 so that the connecting destination is not switched until the communication is finished in order to prevent effects on calls by voice. In the case that the communication status in the first communication system deteriorates, it is possible to take measures for the deterioration during calls by voice even before the communication is finished by forcibly switching the connecting destination of the first antenna element 201 from the antenna switching unit 204 to the second signal processing unit 208.

Figure 3:
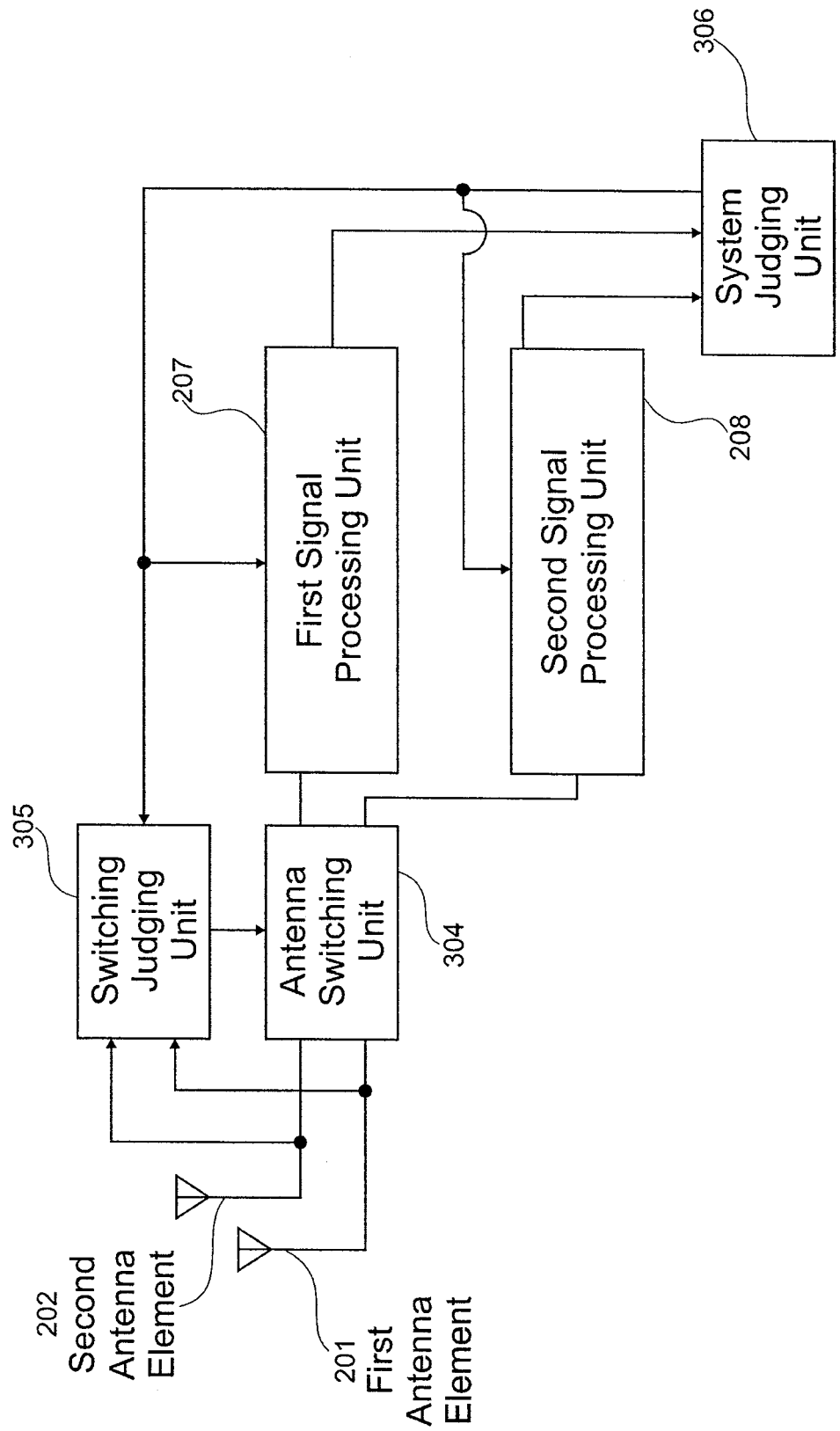
FIG. 3 is a block diagram showing a configuration of a wireless communication equipment according to the first embodiment of the invention.

The embodiment can include a configuration in which the system switching unit 203 is omitted as shown in FIG. 3. In this case, an antenna switching unit 304 differs from the antenna switching unit 204 having two inputs and one output shown in FIG. 1 in a point that the antenna switching unit 304 has two inputs and two outputs.

In FIG. 3, the first antenna element 201 is connected to the antenna switching unit 304, which transmits or receives an RF signal of the first communication system or the second communication system. The second antenna element 202 is connected to the antenna switching unit 304, which transmits or receives an RF signal of the first communication system.

A system judging unit 306 is connected to the first signal processing unit 207 and the second signal processing unit 208, which compares the reception signal strength, BER and the like between signals outputted from the first signal processing unit 207 and the second signal processing unit 208 to output a signal to a switching judging unit 305, which indicates which of the first communication system or the second communication system is used for communication.

The switching judging unit 305 is connected to the system judging unit 306, which knows which of the first communication system or the second communication system is used for the wireless communication based on the signal inputted from the system judging unit 306. When the first communication system is used, the switching judging unit 305 compares the reception signal strength, BER and the like between the signal received in the first antenna element 201 and the signal received in the second antenna element 202. Then, the switching judging unit 305 outputs a signal to the antenna switching unit 304, which switches a connecting destination of the first signal processing unit 207 to the first antenna element 201 or the second antenna element 202. When the second communication system is used, the switching judging unit 305 outputs signals to the antenna switching unit 304, which allows the connecting destination of the second signal processing unit 208 to be the first antenna element 201 and which allows the connecting destination of the first signal processing unit 207 to be the second antenna element 202.

When configured as FIG. 3, the system switching unit 203 can be omitted, therefore, components can be reduced and the attenuation and the noise superimposition of RF signals transmitted and received at the first antenna element 201 can be reduced by decreasing one switch as compared with FIG.

1. Since the second antenna element 202 is made to have a function which transmits and receives the RF signal of the first communication system and the RF signal of the second communication system as well as the first antenna element 201, it is possible to perform communication in the second communication system after comparing the first antenna element 201 to the second antenna element 202 and selecting the antenna having better sensitivity.

Figure 15:
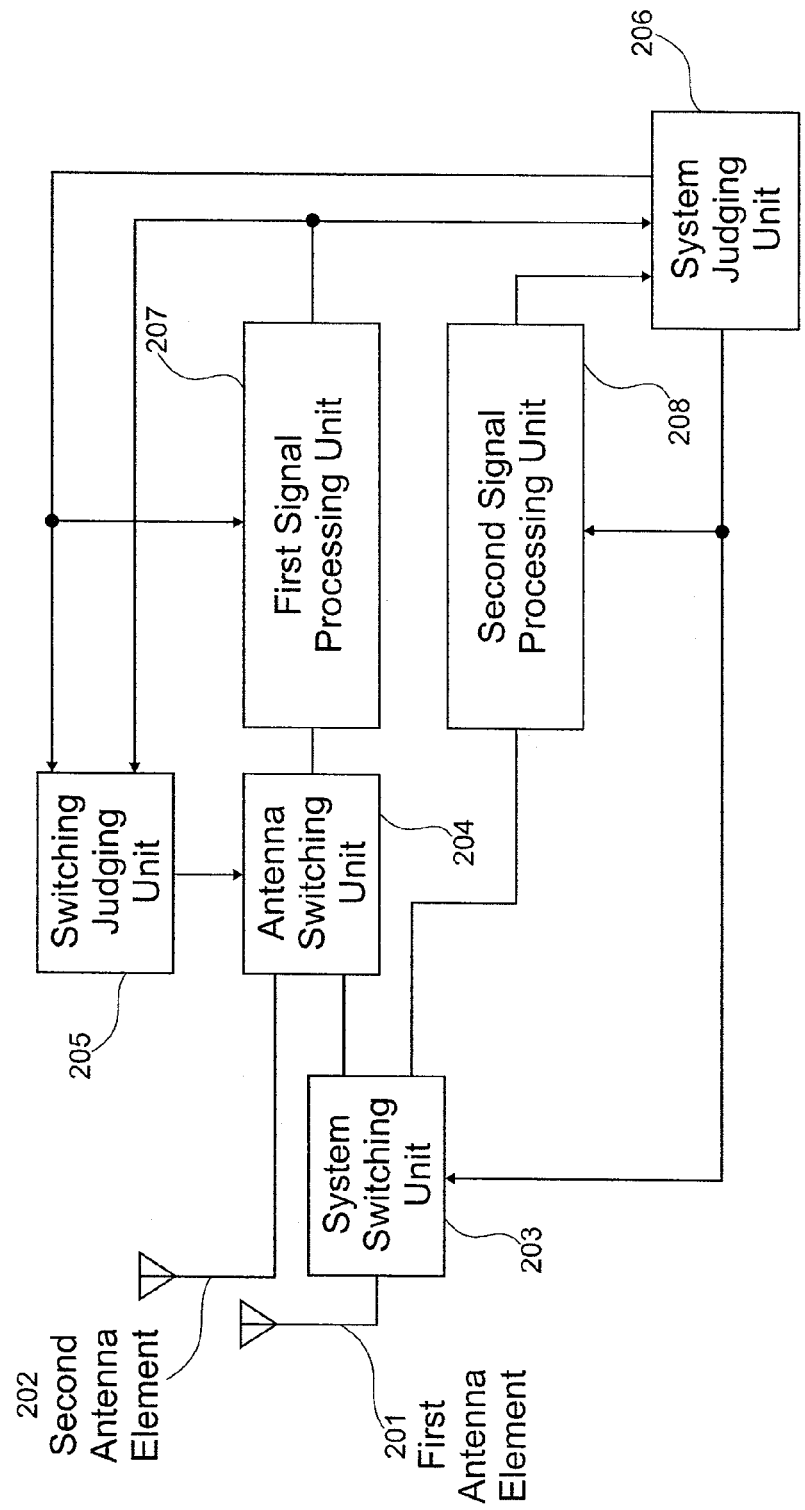
FIG. 15 is a block diagram showing a configuration of the wireless communication equipment according to the first embodiment of the invention.

It is also possible that the switching judging unit 205 and the switching judging unit 305 have a configuration in which output signals of the first signal processing unit 207 are inputted thereinto as shown in FIG. 15. When configured like this, the switching judging unit 205 compares an output of the first signal processing unit 207 when using the first antenna element 201 to an output of the first antenna element 207 when using the second antenna element 202. According to this, the switching judging unit 205 is not required to process the RF signal as compared with the configuration shown in FIG. 1. For example, when the first signal processing unit 207 has a function of outputting a signal to be a judgment criterion such as an RSSI (Reception Signal Strength Indicator), the judgment is possible by comparing the outputs.

Figure 4:
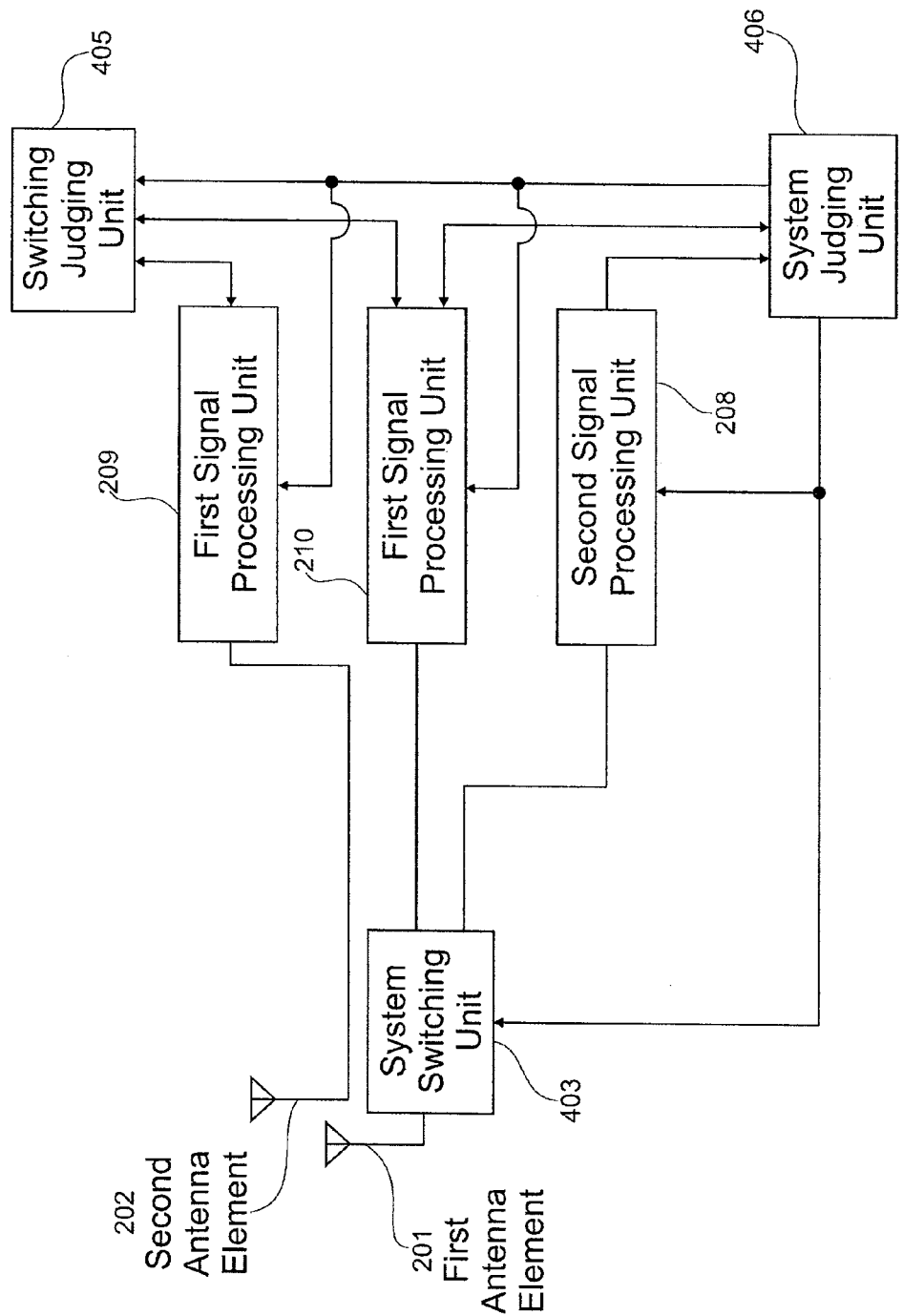
FIG. 4 is a block diagram showing a configuration of a wireless communication equipment according to the first embodiment of the invention.

Furthermore, in the embodiment, it is possible that the antenna switching unit 204 is omitted by employing a configuration having plural first signal processing units as shown in FIG. 4.

In FIG. 4, the first antenna element 201 is connected to the system switching unit 403, which transmits or receives an RF signal of the first communication system or the second communication system. The second antenna element 202 is connected to a first signal processing unit 209, which transmits or receives an RF signal of the first communication system.

A system judging unit 406 is connected to a first signal processing unit 210 and the second signal processing unit 208, which compares the reception signal strength, BER and the like between signals outputted from the first signal processing unit 210 and the second signal processing unit 208 to output a signal which switches a connecting destination of the system switching unit 403 to the first signal processing unit 210 or the second signal processing unit 208. The system judging unit 406 also outputs a signal to the switching judging unit 405, which indicates which unit is connected to the system switching unit 403.

The switching judging unit 405 knows which of the first signal processing unit 210 or the second signal processing unit 208 is connected to the system switching unit 403 based on the signal inputted from the system judging unit 406. When the system switching unit 403 is connected to the first signal processing unit 210, the switching judging unit 405 compares the reception signal strength, BER and the like between the signal outputted from the first signal processing unit 209 and signals outputted from the first signal processing unit 210, and judges which of the first antenna element 201 or the second antenna element 202 is used for communication with respect to the first communication system. In the case that the first signal processing units 209, 210 have a function of outputting a signal to be a judgment criterion such as the RSSI, the switching judging unit 405 can judge which of the first antenna element 201 or the second antenna element 202 is used for communication by comparing the signals. When configured as in FIG. 4, the attenuation and the noise superimposition of RF signals transmitted and received at the first antenna element 201 can be reduced by decreasing one switch as compared with FIG. 1 in the same way as FIG. 3. The switching judging unit 405 is not required to process the RF signal as compared with the case having the configuration of FIG. 1.

As described above, according to the embodiment, diversity reception or transmission using the first antenna element 201 and the second antenna element 202 is possible with respect to the first communication system, and the communication using the first antenna element 201 is possible with respect to the second communication system. It is also possible that the number of antennas used for communication is automatically switched between different communication systems by detecting the communication status by the other communication system intermittently during the interruption of communication regardless of the extension state of the antenna element. Furthermore, transmission and reception can be performed with respect to the communication system which is monitored. In the case of configurations of FIG. 3 and FIG. 4, loss by switches can be reduced by decreasing one switching unit.

The first communication system is not particularly limited, and can be the PHS system, systems of a wireless LAN such as IEEE 802.11a, IEEE802.11b other than the PDC system if the system performs the diversity. The second communication system is not particularly limited, and can be a GSM (Global System for Mobile communications) system other than the W-CDMA system if the system does not perform the diversity. The antenna used for the diversity is not limited to two. A configuration in which the first and second signal processing units have different circuits for the transmission and reception is possible, and further, the sharing of circuits such as a local oscillator or an amplifier, the sharing of the baseband processing unit using DSP, FPGA and the like, and the miniaturization by the use of a reconfiguration device are also possible. It is also limited to the RF circuit portion, and can include other circuit portions such as an IF circuit portion. As the antenna element, a multiband antenna, directional antenna or the like which corresponds to the first communication system and the second communication system can be also used.

Embodiment 2

Figure 5:
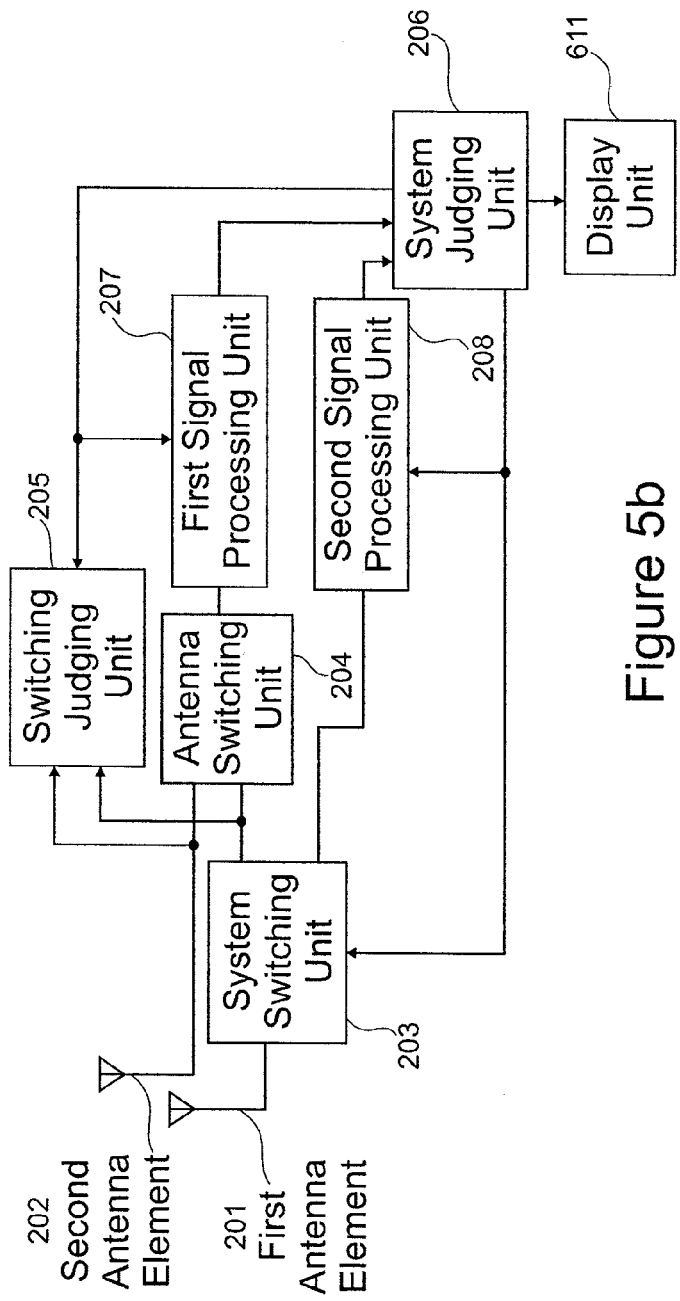
FIG. 5A is a block diagram showing a configuration of a wireless communication equipment according to a second embodiment of the invention.
FIG. 5B is a view showing display contents in a display part of the wireless communication equipment according to the second embodiment of the invention.

FIG. 5A is a block diagram showing a configuration of a wireless communication equipment according to a second embodiment of the invention.

In FIG. 5A, the configuration from the first antenna element 201 to the second signal processing unit 208 is same as the configuration and the operational effect shown in FIG. 1, therefore, detailed explanations are omitted. A point different from the configuration of FIG. 1 is that the configuration has a display function (a display unit 611) such as a display which displays information based on a signal from the system judging unit 206. Since the wireless communication equipment of the embodiment has the display unit 611, as shown in FIG. 5B, it is possible to display a display mark 601 of the out-of area in the step S510 of FIG. 2, a display mark 602 of the receiving status of the first communication system in the step S507, a display mark 603 of the receiving status of the second communication system in the step S509, and a display mark 604 of the receiving status of the first communication system and the second communication system in the step S504.

Figure 16:
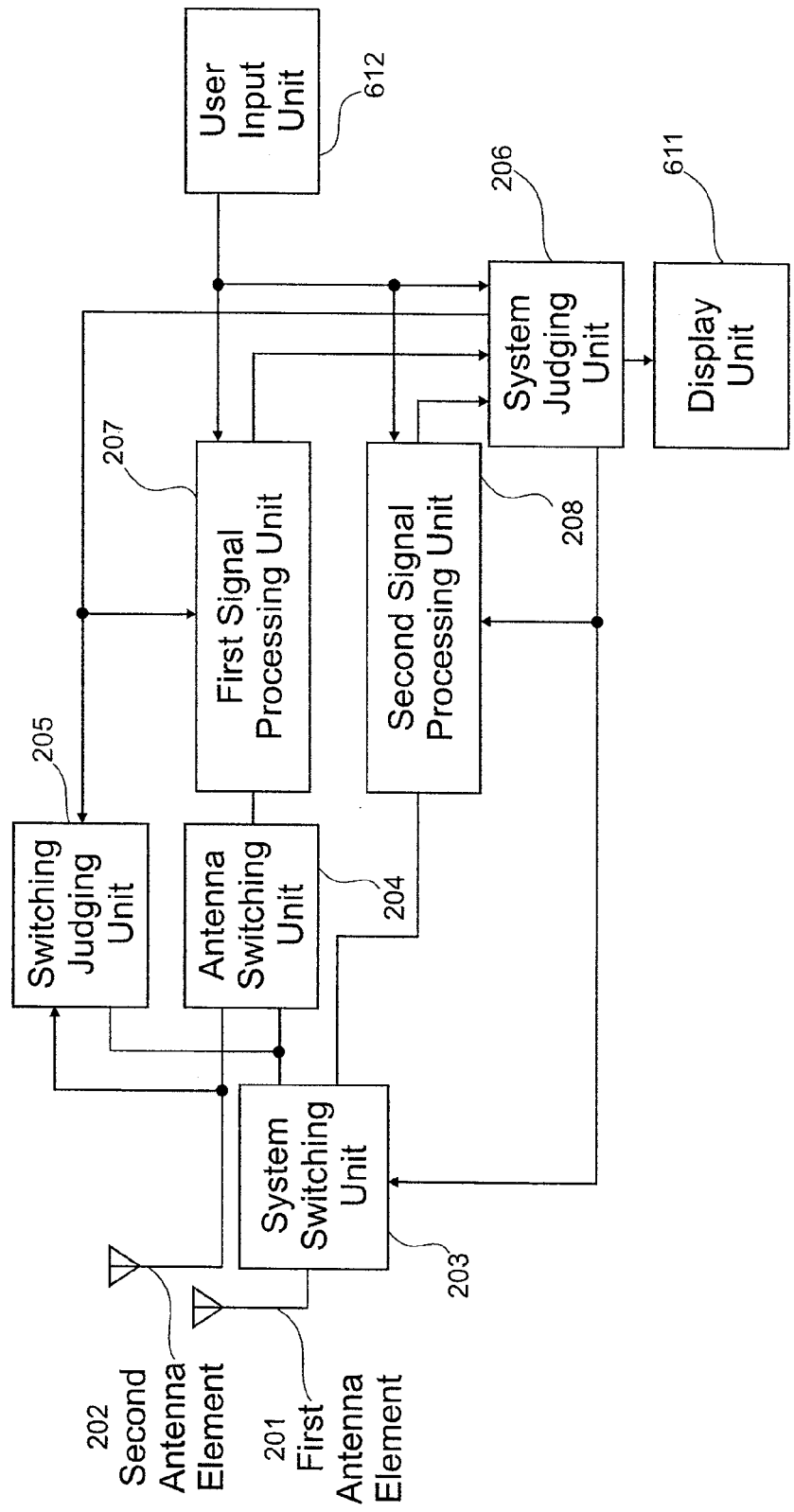
FIG. 16 is a block diagram showing a configuration of the wireless communication equipment according to the second embodiment of the invention.
Figure 17:
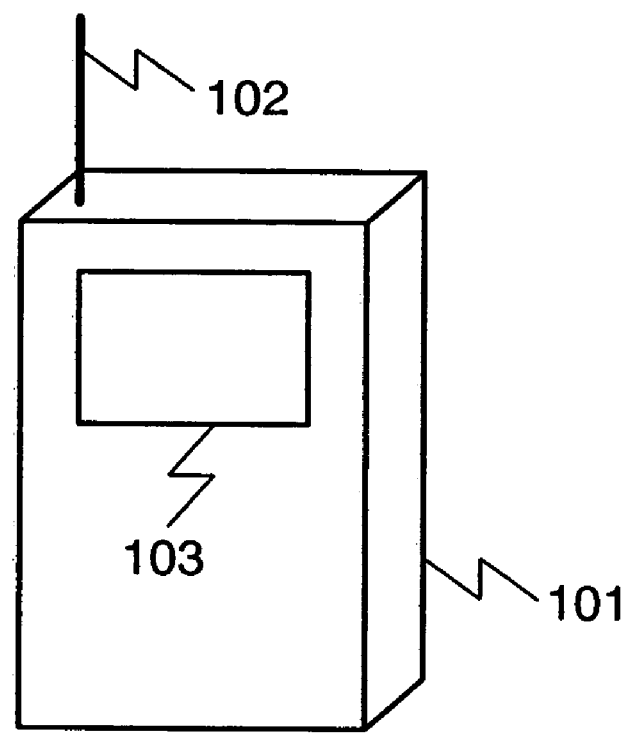
FIG. 17 is a conceptual view showing a structure of an antenna element of a conventional wireless communication equipment.
Figure 18:
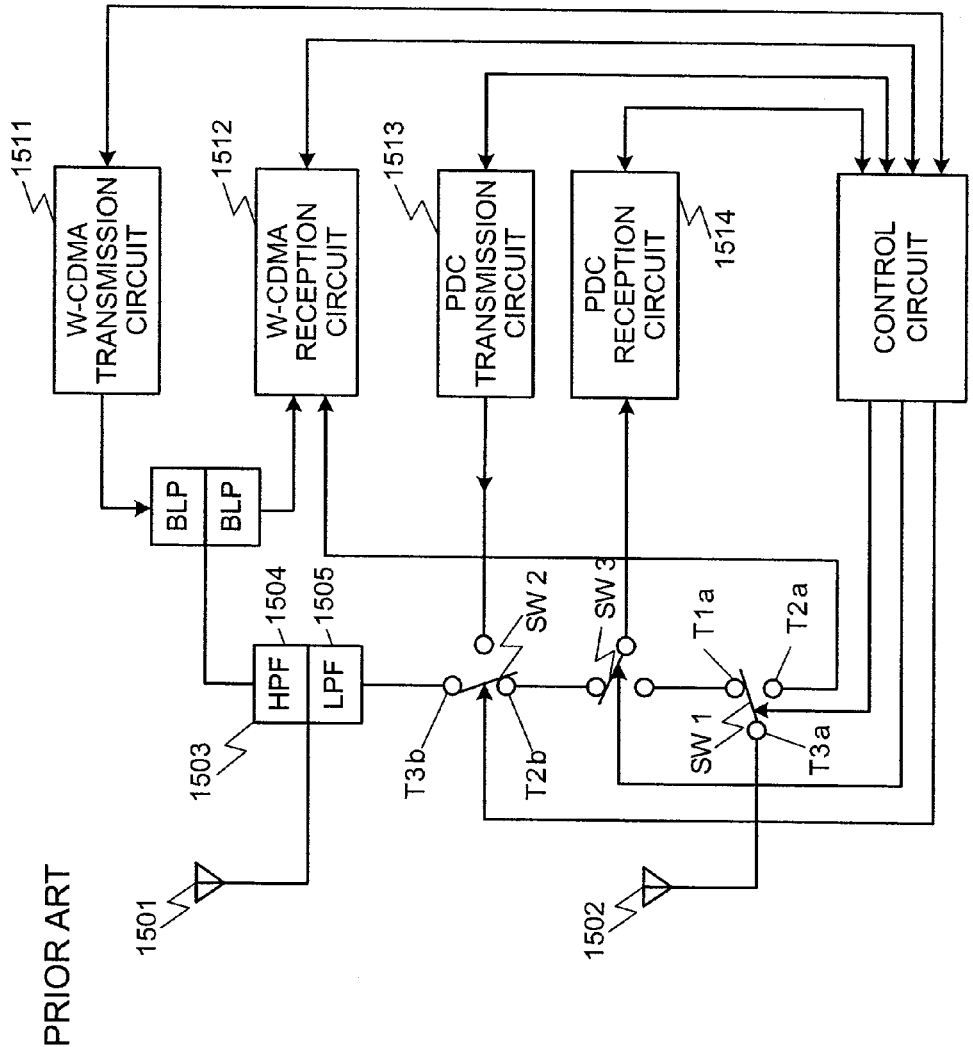
FIG. 18 is a block diagram showing a configuration the conventional wireless communication equipment.

A case in which the wireless communication equipment of the embodiment further includes an user input unit 612 as shown in FIG. 16 will be explained.

The user input unit 612 is connected to the first signal processing unit 207, the second signal processing unit 208 and the system judging unit 206. The user input unit 612 can be operated by a user of the wireless communication equipment, and the user can operate the first signal processing unit 207, the second signal processing unit 208 and the system judging unit 206 by operating the user input unit 612. Specifically, the user can operate ON/OFF of the power supply with respect to the first signal processing unit 207 and the second signal processing unit 208. The system judging unit 206 is controlled so that the connection destination of the first antenna element 201 is to be the second signal processing unit 208 when the power supply of the first signal processing unit 207 is "OFF", and so that the connecting destination of the first antenna element 201 is to be the antenna switching unit 204 when the power supply of the second signal processing unit 208 is "OFF".

According to the configuration, the user can operate the user input unit 612 based on the display of the display unit 611. For example, since the communication in the second communication system can not be performed when the display mark 602 of FIG. 5B is displayed, the power supply of the second signal processing unit 208 is switched "OFF". Since the communication in the first communication system can not be performed when the display mark 603 of FIG. 5B is displayed, the power supply of the first signal processing unit 207 is switched "OFF", which enables the wireless communication equipment to save the power.

As described above, according to the embodiment, the user can perform the operation reducing the power consumption of the wireless communication equipment in accordance with the display content by displaying the receiving status of plural communication systems.

Embodiment 3

Figure 6:
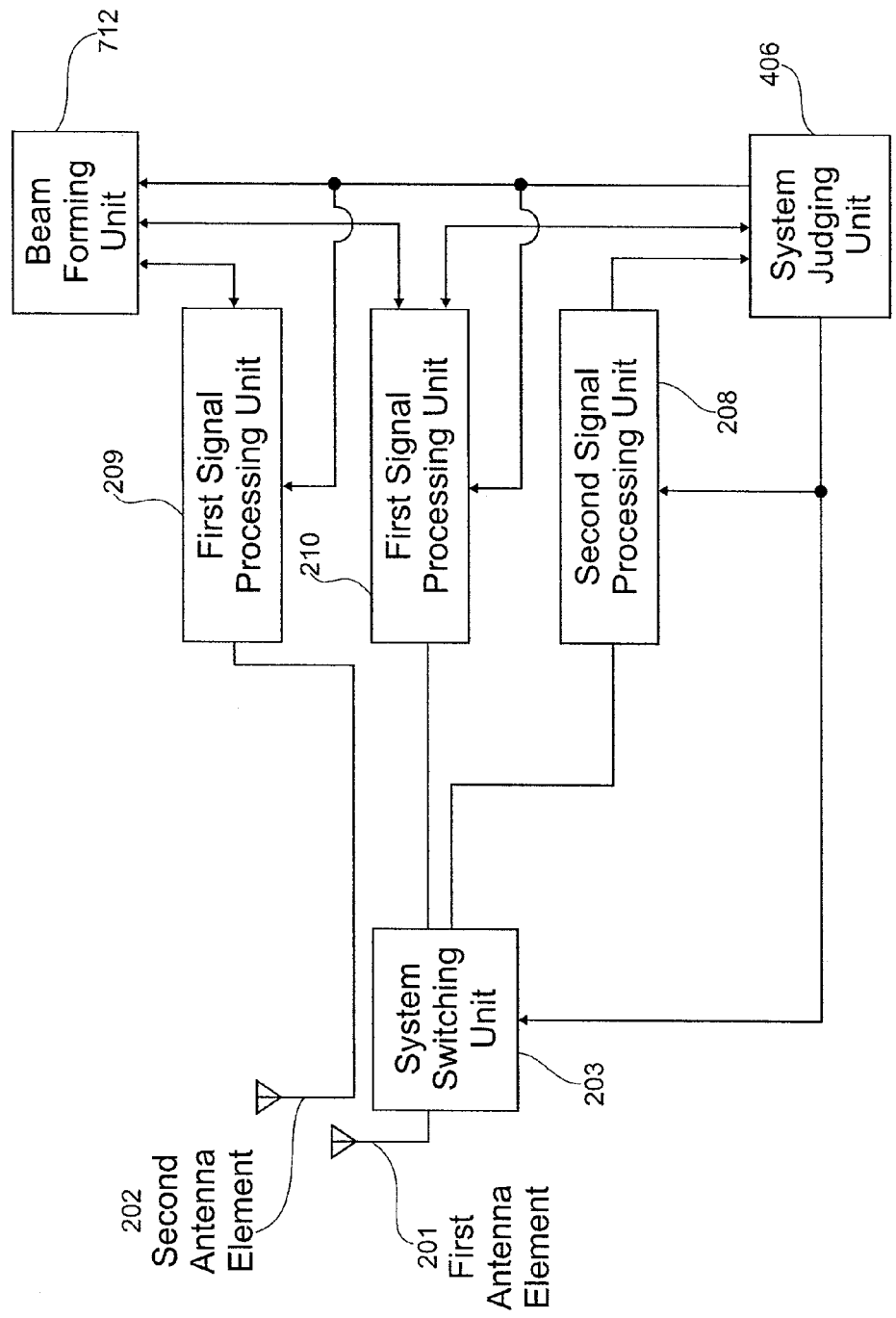
FIG. 6 is a block diagram showing a configuration of a wireless communication equipment according to a third embodiment of the invention.

FIG. 6 is a block diagram showing a configuration of a wireless communication equipment according to a third embodiment of the invention. In the first embodiment, the example of the selection diversity which switches the antenna element used for communication was shown. In the embodiment, an example of a combining diversity will be shown. The wireless communication equipment according to the embodiment shown in FIG. 6 differs from the first embodiment in a point that it includes a beam forming unit 712 instead of the switching judging unit 405 in the wireless communication equipment of the first embodiment shown in FIG. 4.

In FIG. 6, the beam forming unit 712 is connected to the first signal processing units 209, 210, which have a function controlling phases and amplitudes of respective signals inputted from the first signal processing units 209, 210 and which can perform an equal gain combining when adjusting only phases and can perform an maximum rate combining when adjusting phases and amplitudes.

The beam forming using the first antenna element 201 and the second antenna element 202 is possible by adjusting phases and amplitudes, which enables an antenna pattern to vary. For example, the reception probability can be increased by using the non-directive antenna pattern during standby (step S501 in FIG. 2), and the communication which is hardly affected by a human body is possible during the communication in the first communication system (step S507 in FIG. 2) by an antenna pattern in which the null is directed in the direction of the human body.

As described above, according to the embodiment, the combining diversity using the first antenna element 201 and second antenna element 202 can be performed with respect to the first communication system. It is also possible to perform an efficient wireless communication by changing the antenna pattern using the first antenna element 201 and the second antenna element 202.

The antenna used for the diversity is not limited to two antennas.

Since the embodiment includes two signal processing units with respect to the first communication system, it can be also applied to a MIMO system by providing a signal processing unit for MIMO (Multiple Input Multiple Output) instead of the beam forming unit 712.

Embodiment 4

Figure 7:
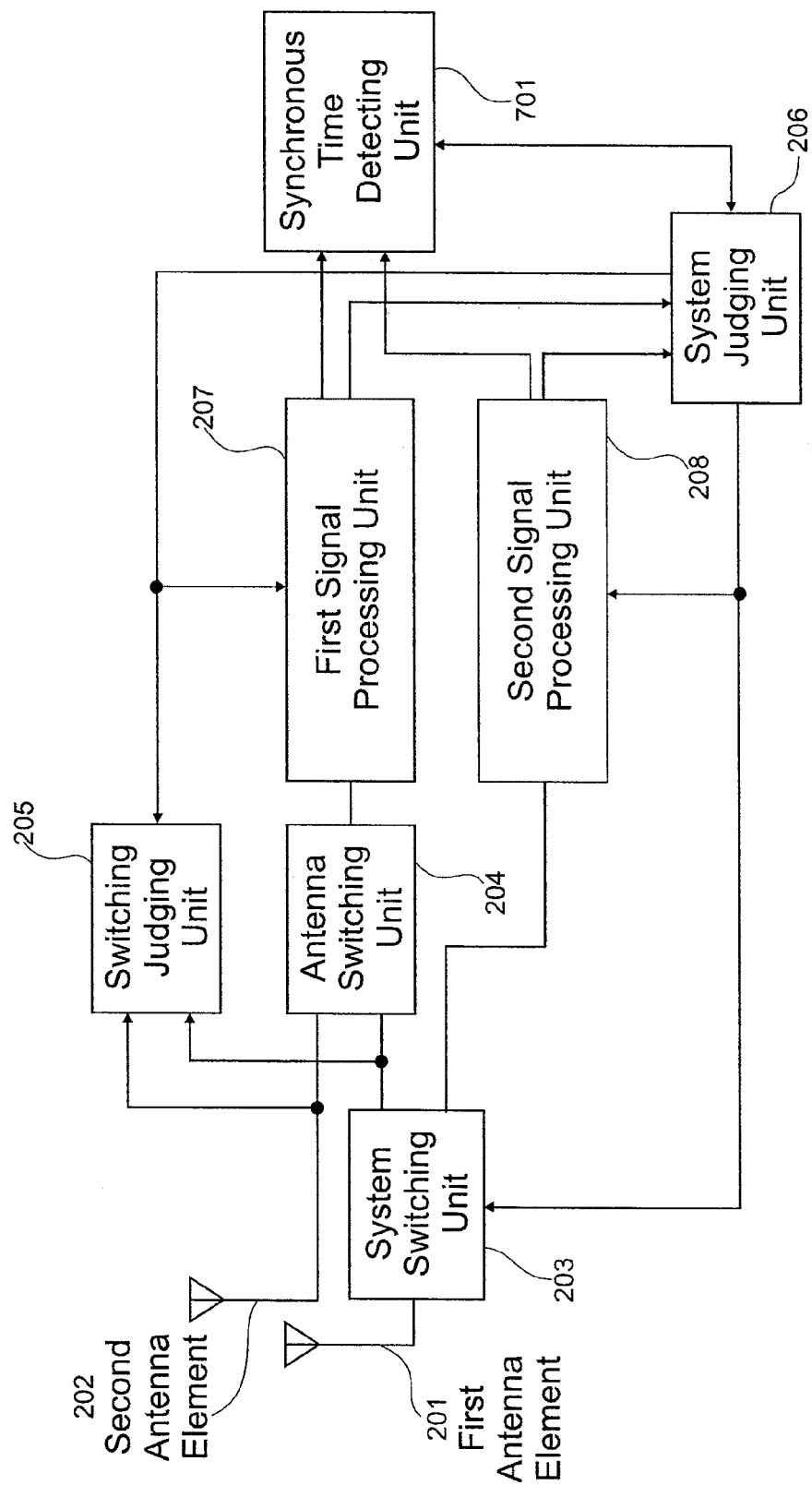
FIG. 7 is a block diagram showing a configuration of a wireless communication equipment according to a fourth embodiment of the invention.

FIG. 7 is a block diagram showing a configuration of a wireless communication equipment according to a fourth embodiment of the invention.

In FIG. 7, the configuration differs from the wireless communication equipment of the first embodiment in a point having a synchronous timing detecting unit 701. The synchronous timing detecting unit 701 is connected to the first signal processing unit 207 and the second signal processing unit 208, which has a function of informing the system judging unit 206 of the timing of the control for the system switching unit 203 and the switching judging unit 205 based on the timing of transmission, reception and synchronization with respect to the first communication system outputted from the first signal processing unit 207 and the timing of transmission, reception and synchronization with respect to the second communication system outputted from the second signal processing unit 208. Specifically, the synchronous timing detecting unit 701, when receiving a notification of starting the confirmation of the receiving status of the communication in the second communication system from the system judging unit 206, notifies the system judging unit 206 of the timing of communication processes required until the confirmation of the receiving status in the second communication system is finished.

The operations in the embodiment are basically same as the first embodiment, however, since a method of switching a connecting destination of the first antenna element 201 to the second signal processing unit 208 intermittently and confirming the receiving status of the second communication system (step S511) differs from the first embodiment, the method will be explained hereinafter.

Figure 8:
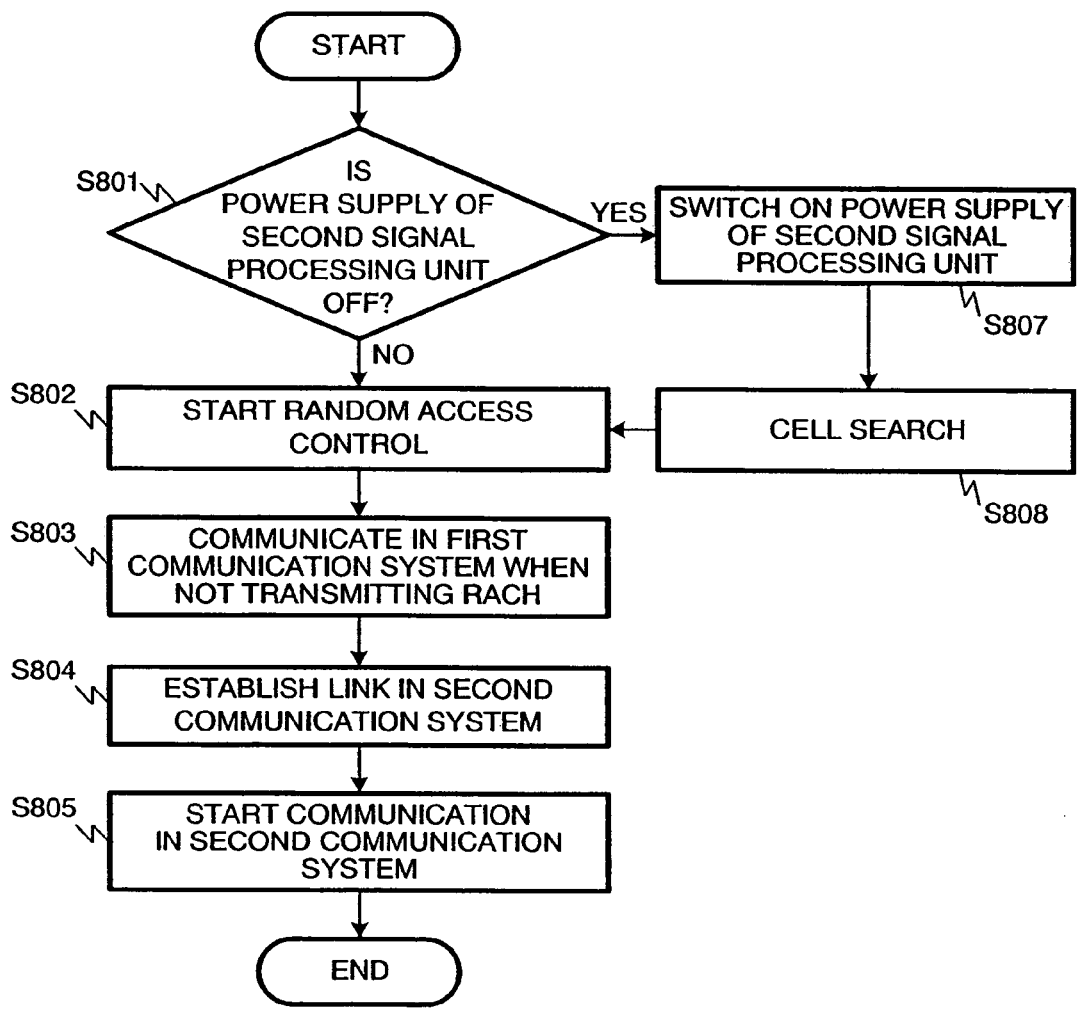
FIG. 8 is a flow chart showing operations of the wireless communication equipment according to the fourth embodiment of the invention.

FIG. 8 is a flow chart showing operations for confirming the receiving status of the second communication system during the communication in the first communication system. In the embodiment, a case in which the first communication system is the IEEE802.11a system and the second communication system is the W-CDMA system will be explained.

When performing communication in the first communication system, the first antenna element 201 and the second antenna element 202 are connected to the antenna switching unit 204, therefore, a power supply of the second signal processing unit 208 can be "OFF".

In the W-CDMA system, when performing the cell search, operations of the wireless communication equipment at the time of starting up the power supply, at the time of a handover, and during standby are different. In the embodiment, the other communication system is supposed to be switched to the W-CDMA system, therefore, the two cases when starting up the power supply and during standby will be explained. The cell search is executed in a step of detecting the cell through the stages of establishing a downlink to the base station and identifying the cell at the time of starting up the power supply, and a step of detecting the cell of the maximum reception level by every fixed time during standby.

In FIG. 8, first, when an operation of switching to the second communication system occurs, the system judging unit 206 judges whether the power supply of the second signal processing unit 208 is "OFF" (step S801).

When the judged result of the step S801 is "NO", the second signal processing unit 208 is in a state of standby in the second communication system, therefore, it is considered that the down-link is already established in the second communication system and the process proceeds to a step S802. However, when the step of detecting the cell of the maximum reception level is required, the step have to be added before proceeding to the step S802.

Figure 9:
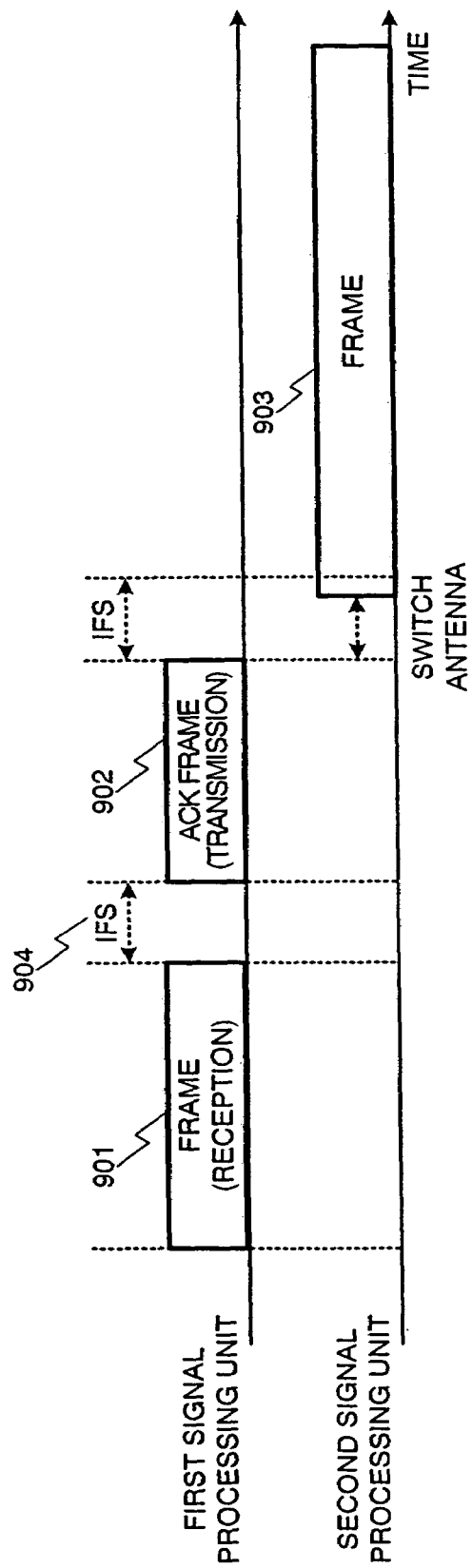
FIG. 9 is a timing chart showing a communication operation of the wireless communication equipment according to the fourth embodiment of the invention.

FIG. 9 shows the timing when the second signal processing unit 208 starts the establishment of an up-link in the second communication system in the step S802. In the IEEE802.11a system, in the case of an autonomous distributed control, a CSMA/CA (Carrier Sense Multiple Access with Collision Avoidance) system is used. When a data frame is correctly received in a reception side, the control is performed, in which an ACK frame (ACKnowledgement frame) is transmitted after waiting for the time of an IFS (Inter Frame Space) to complete the communication. When a data frame is correctly transmitted, the control is performed, in which the ACK frame is received after waiting for the time of the IFS to complete the communication.

In the step S802, before the second signal processing unit 208 starts the establishment of the up-link in the second communication system, the first signal processing unit 207 performs communication in the first communication system, therefore, as shown in FIG. 9, the first signal processing unit 207, when receiving a data frame 901 correctly from a base station of a wireless system providing the first communication system, transmits an ACK frame 902 to the base station of the wireless system providing the first communication system after waiting for an IFS time (904). Since the first signal processing unit 207 waits for an IFS time after the transmission of the ACK frame 902, the system judging unit 206 controls the system switching unit 203 so as to switch a connecting destination of the first antenna element 201 from the antenna switching unit 204 to the second signal processing unit 208 during the IFS time.

After finishing the switching of the connecting destination of the first antenna element 201, the second signal processing unit 208 transmits a frame 903 used for the establishment of the up-link to the base station of the wireless system providing the second communication system, and starts the establishment the up-link to the base station of the wireless system providing the second communication system.

When the first signal processing unit 207 transmits the data frame correctly to the base station providing the first communication system before the second signal processing unit 208 starts the establishment of the up-link in the second communication system, the timing is same as the case when the data frame is received from the base station providing the first communication system. Specifically, after finishing the reception of the ACK frame from the base station providing the first communication system, the connecting destination of the first antenna element 201 is switched from the antenna switching unit 204 to the second signal processing unit 208 during the IFS time to start the establishment of the up-link to the base station providing the second communication system.

In the case that the judged result of the step S801 is "YES", the system judging unit 206 switches on the power supply of the second signal processing unit 208 (step S807).

Next, when the power supply of the second signal processing unit 208 is switched on, the second signal processing unit 208 starts the establishment of the down-link to the base station in the second communication system. However, the timing of starting the down-link is controlled by the system judging unit 206 based on timing information from the synchronous timing detecting unit 701 and the operation is performed at the same timing as FIG. 9.

When the second signal processing unit 208 starts the establishment of the down-link to the base station of the wireless system providing the second communication system by transmitting the frame used for the establishment of the down-link to the base station of the wireless system providing the second communication system, the system judging unit 206 performs control so that the communication in the first communication system is not performed until the down-link is established in such a manner that the carrier sense is not performed with respect to the first signal processing unit 207 (step S808). Next, when the down-link in the second communication system is established, the second signal processing unit 208 starts the establishment of the up-link by the RACH (random access control)(step S802).

At this time, the RACH transmitted to the base station by the wireless communication equipment is intermittent, therefore, the system judging unit 206 switches the connecting destination of the first antenna element 201 from the second signal processing unit 208 to the antenna switching unit 204 when not transmitting the RACH, which enables the communication in the first communication system. The system judging unit 206 enables the communication in the first communication system again in such a manner that the carrier sense is performed with respect to the first signal processing unit 207.

Figure 11:
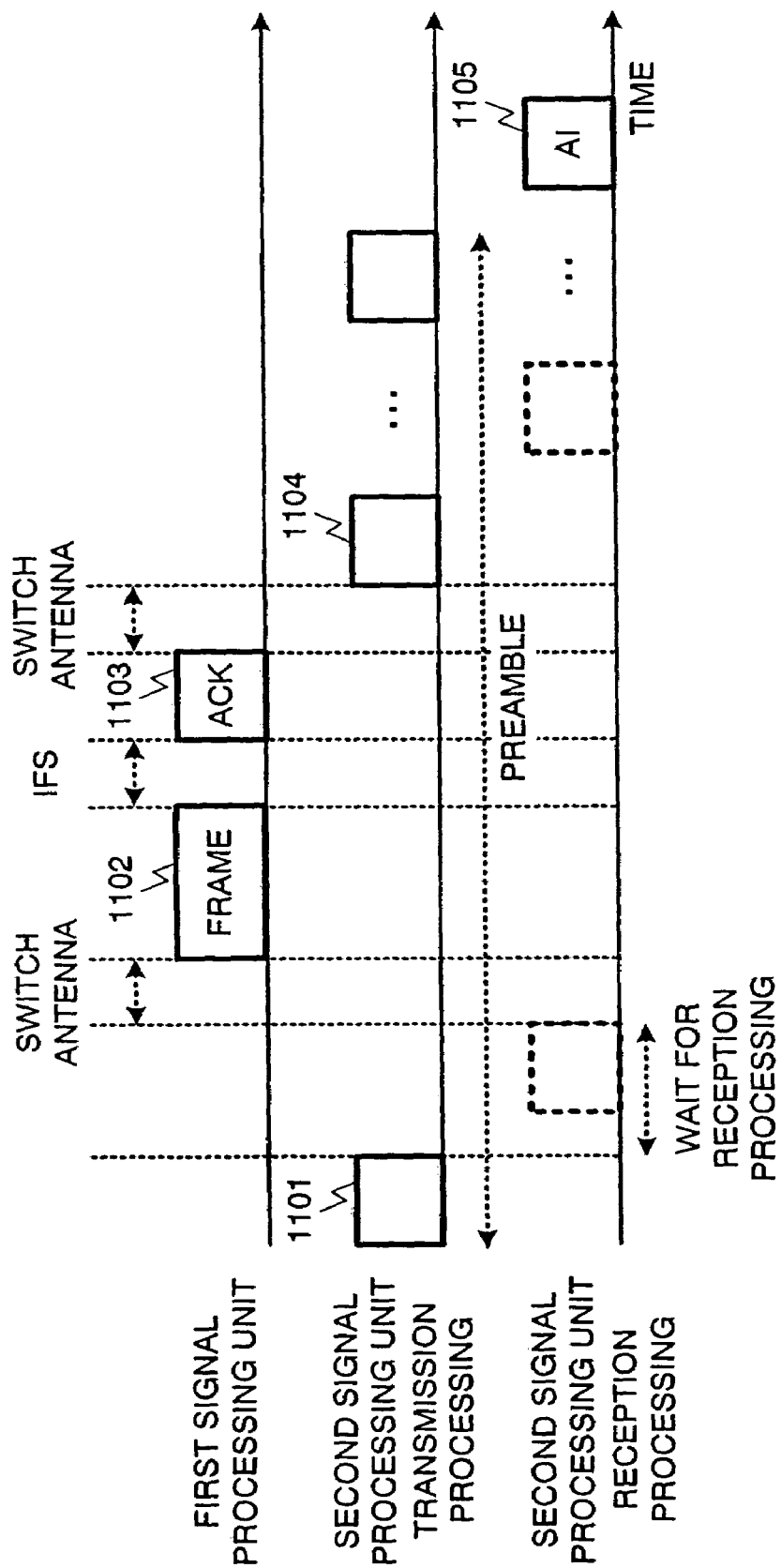
FIG. 11 is a timing chart showing a communication operation of the wireless communication equipment according to the fourth embodiment of the invention.

FIG. 11 shows the timing of switching from the second communication system to the first communication system, and the timing of switching from the first communication system to the second communication system when the RACH is not transmitted.

The system judging unit 206 can know the timing when the second signal processing unit 208 executes the random access control from the synchronous timing detecting unit 701. The system judging unit 206 knows at what timing the second signal processing unit 208 transmits or receives signals until the second signal processing unit 208 receives an AI 1105 from the base station after transmitting a preamble 1101 of the PRACH. The system judging unit 206, when receiving the notification of the timing, switches the connecting destination of the first antenna element 201 from the second signal processing unit 208 to the antenna switching unit 204 at the timing when the second signal processing unit 208 does not transmit and receive signals. After the connecting destination of the first antenna element 201 is switched, the first signal processing unit 207 transmits or receives a frame 1102 of the first communication system, and transmits or receives an ACK frame 1103. At this time, the system judging unit 206 knows the timing when the second signal processing unit 208 transmits a next preamble 1104 of the PRACH based on information outputted from the synchronous timing detecting unit 701, therefore, the system judging unit 206 performs the control in which the connecting destination of the first antenna element 201 is returned to the second signal processing unit 208 from the antenna switching unit 204 at the required timing.

The second signal processing unit 208 transmits a preamble 1104 of the PRACH again. The transmission and reception of frames in the first communication system by the first signal processing unit 207, and the transmission of preambles of the PRACH by the second signal processing unit 208 are repeated until receiving the AI 1105 from the base station providing the second communication system (step S803). Next, the second signal processing unit 208, when receiving the AI (1003) as shown in FIG. 10, transmits the message portion 1004 of the RRACH to the base station to establish the up-link (step S804).

Next, the second signal processing unit 208 performs communication with the base station (step S805), the system judging unit 206 compares the receiving status in the second communication system to the receiving status in the first communication system during continuation of the communication based on the signal outputted from the second signal processing unit 208.

The above is the method of confirming the receiving status of the second communication system during the communication in the first communication system.

Concerning the following processing, the system judging unit 206, when judging that the communication should be switched to the second communication system, instructs the second signal processing unit 208 to start the communication in the second communication system in the same way as the first embodiment. The system judging unit 206 also performs the controls by instructing the switching judging unit 205 to allow the connecting destination of the first signal processing unit 207 to be the second antenna element 202. According to this, the communication can be performed in the second communication system using the first antenna element 201 from that time, at the same time, it is possible to monitor the receiving status in the first communication system using the second antenna element 202.

On the other hand, it is judged that the communication in the first communication system should be maintained, the processes from the step S505 in FIG. 2 are repeated again.

As described above, according to the embodiment, when switching from the first communication system to the second communication system, efficient wireless communication is possible by performing communication in the first communication system at the timing when the communication in the second communication system is not performed, using the time until the wireless link in the second communication system is established.

When the IEEE802.11a system performs an access control by the central control from the base station, the same method as the embodiment can be applied by allowing the timing of beacons to be the timing at which the frame 1102 in FIG. 11 can be transmitted.

The first communication system is not limited to the CSMA/CA system and it can be the system that can control the timing at which the communication is performed. Further, the configuration of the wireless communication equipment can be applied to ones having configurations in FIG. 3, FIG. 4, FIG. 5A, and FIG. 6.

In the embodiment, the cell search is performed when the power supply of the second signal processing unit 208 is not "ON", however, it is not limited to that, even when the wireless communication equipment leaves from the old cell by the movement (during the handover), the cell search is possible in the state of communication in the first communication system by processing in the same way as the embodiment.

The example of the control in which the first signal processing unit 207 does not perform communication during the cell search is explained in the embodiment, however, it is not limited to that, it can also possible that the system judging unit 206 manages the prescribed time based on the timing information from the synchronous timing detecting unit 701 to perform the cell search intermittently. Specifically, the system judging unit 206, when judging the necessity of the cell search, outputs a signal to the system switching unit 203, which switches the system to the second communication system, at the same time, the synchronous timing detecting unit 701 notifies the system judging unit 206 of the timing of prescribed time, then, the system judging unit 206 outputs the signal for the switching to the system switching unit 203 to return the system to the first communication system even if the cell search is not completed. The prescribed time is made to be the time during the idle period of the first communication system, as a result, it is possible to monitor the second communication system while maintaining the communication in the first communication system even if the first signal processing unit 207 is not controlled so as not to perform the communication.

Embodiment 5

Figure 13:
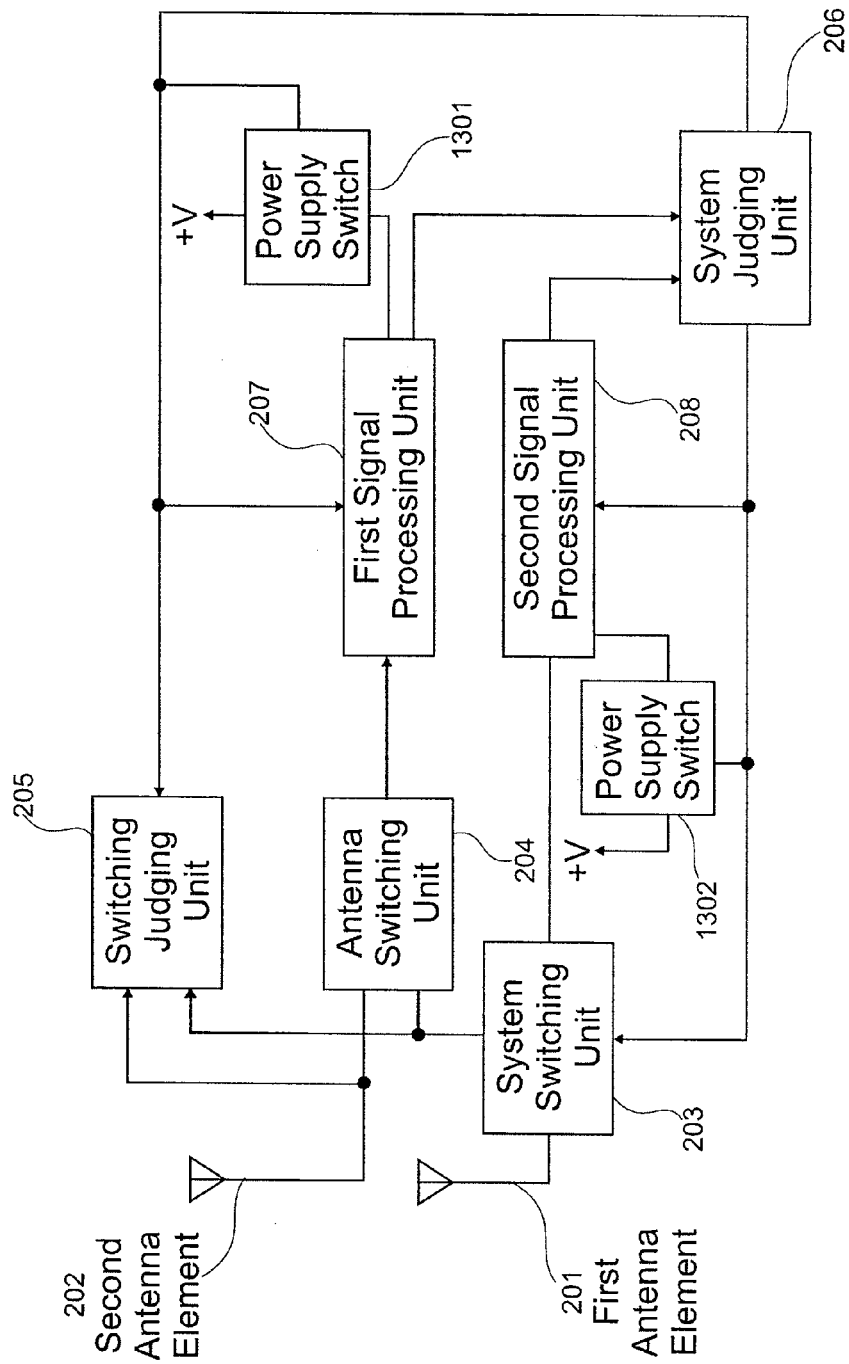
FIG. 13 is a block diagram showing a configuration of a wireless communication equipment according to the fifth embodiment of the invention.

FIG. 13 is a block diagram showing a configuration of a wireless communication equipment according to a fifth embodiment of the invention.

In FIG. 13, the embodiment differs from the embodiment 1 in a point that it includes power supply switches 1301, 1302, and that the system judging unit 206 controls these switches to allow the power supplies of the first signal processing unit 207 and the second signal processing unit 208 to be "ON" or "OFF".

The operation of the wireless communication equipment of the embodiment differs from the embodiment 1 in a point that the equipment controls "ON" and "OFF" of these power supplies during standby of the communication, which will be explained with reference to the drawing.

Figure 12:
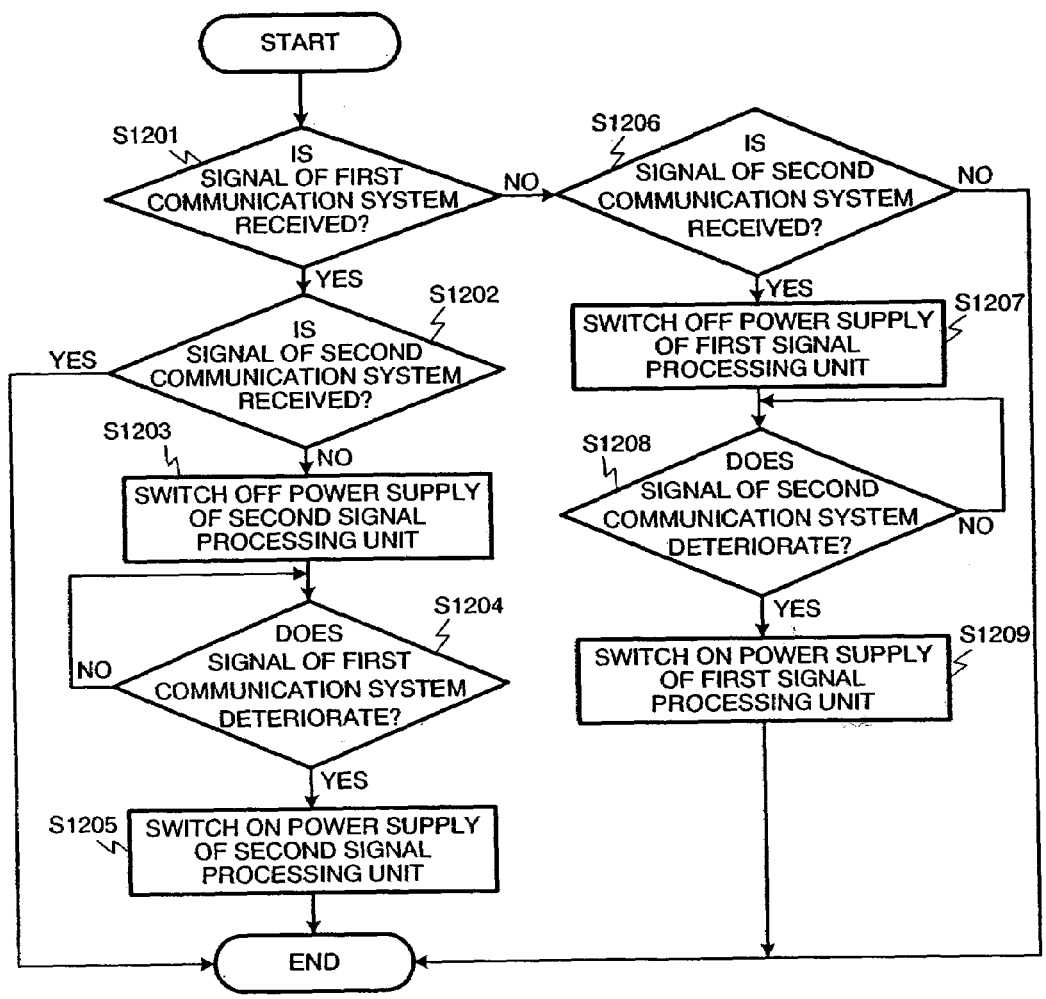
FIG. 12 is a flow chart showing operations of a wireless communication equipment according to a fifth embodiment of the invention.

FIG. 12 is a flow chart showing the operation of controlling the power supply when the wireless communication equipment in the embodiment is in the standby state. FIG. 12 shows procedures of operating while saving the power (power saving processing) in the case of the state in which both signals of the first communication system and the second communication system are received in the step S501 of FIG. 2 shown in the embodiment 1.

In FIG. 12, first, the first antenna element 201 is connected to the second signal processing unit 208, and second antenna element 202 is connected to the first signal processing unit 207 through the antenna switching unit 204. The system judging unit 206 judges whether a signal of the first communication system is received based on a signal outputted from the first signal processing unit 207 (step S1201). When the judged result is "YES", whether a signal of the second communication system is received is judged based on a signal outputted from the second signal processing unit 208 at the next step (step S1202).

When the judged result of the step S1202 is "YES", it is the state in which the signal of the first communication system and the signal of the second communication system are received, therefore, the power saving process is finished and the process proceed to the step S502 in FIG. 2. The following operations are same as the embodiment 1.

When the judged result of the step S1202 is "NO", it is the state in which the signal of the first communication system is received but the signal of the second communication system is not received, therefore, the power supply switch 1302 of the second signal processing unit 208 is switched off (step S1203).

Next, the system judging unit 206 confirms whether the signal in the first communication system is received at each prescribed time intermittently based on the signal outputted from the first signal processing unit 207. For example, the system judging unit 206, when judging that the reception power and the like become lower than a threshold level set in advance, switches on the power supply switch 1302 of the second signal processing unit 208 (step S1205) to finish the power saving process.

When the judged result of the step S1201 is "NO", the system judging unit 206 judges whether the signal from the second communication system received based on the signal outputted from the second signal processing unit 208 as same as the step S1202 (step S1206). Then, when the judged result thereof is "NO", it is the state in which both signals of the first communication system and the second communication system are not received, therefore, the power saving processing is finished.

In the case that the judged result of the step S1206 is "YES", it is the state in which the signal of the second communication system is received but the signal of the first communication system is not received, therefore, the power supply switch 1301 of the first signal processing unit 207 is switched off (step S1207).

Next, the system judging unit 206 confirms whether the signal of the second communication system is received based on the signal outputted from the second signal processing unit 208 intermittently. Then, for example, the system judging unit 206, when judging that the reception power and the like become lower than threshold levels set in advance, switches on the power supply switch 1301 of the first signal processing unit 207 (step S1209) to finish the power saving processing.

As described above, according to the embodiment, in the status in which the communication in the first communication system can not be performed, the power supply of the first signal processing unit 207 is switched off, and in the status in which the communication in the second communication system can not be performed, the power supply of the second signal processing unit 208 is switched off, as a result, it is possible to aim at saving the power of the wireless communication equipment.

In the case that the order of priority is prescribed in advance based on parameters such as power consumption in the first communication system and the second communication system, it is possible that the process proceeds to the step S1203 or the step S1207 depending on the order of priority when the judged result of the step S1202 is "YES". The power saving processing can be applied to the wireless communication equipments having configurations in FIG. 3, FIG. 4, FIG. 5A and FIG. 6.

When the reception in the first communication system is performed such as the step S1201 or the step S1204, it is possible that the first antenna element 201 is connected to the antenna switching unit 204 and that the receiving status of the first communication system is confirmed using both first antenna element 201 and the second communication system 202. According to this, the accuracy of judgment by the system judging unit 206 can be increased.

INDUSTRIAL APPLICABILITY

The wireless communication equipment and the wireless communication method according to the invention are useful for the wireless communication equipment capable of performing communication by plural communication systems, and preferable for performing communication by switching between the communication system using plural antenna elements and the communication system not using plural antenna elements.

The invention claimed is:

1. A wireless communication equipment, comprising:
   a first antenna element and a second antenna element for receiving wireless signals;
   a first signal processing unit for performing reception processing of a first wireless signal in a first communication system received by at least one of the first antenna element and the second antenna element;
   a second signal processing unit for performing reception processing of a second wireless signal in a second communication system received by one antenna element of the first antenna element and the second antenna element other than the antenna element receiving the first wireless signal; and
   a system judging unit for comparing a receiving status of the first wireless signal in the first communication system with a receiving status of the second wireless signal in the second communication system and judging which of the first communication system or the second communication system is used for communication based on respective output signals from the first signal processing unit and the second signal processing unit, and
   wherein when receiving a notification of selecting the first communication system from the system judging unit, a diversity by the first antenna element and the second antenna element is performed, and when receiving a notification of selecting the second communication system, wireless communication by the first antenna element or the second antenna element is performed.

2. The wireless communication equipment according to claim 1, further comprising:
   a switching judging unit for judging switching between the communication by the first antenna element and the communication by the second antenna element.

3. The wireless communication equipment according to claim 1, further comprising:
   a beam forming unit for performing a combining diversity by the first antenna element and the second antenna element.

4. The wireless communication equipment according to claim 1,
   wherein the first communication system is a system for performing the diversity by plural antenna elements including a PDC system, and the second communication system is a system for not performing the diversity by plural antenna elements including a W-CDMA system or a GSM system.

5. The wireless communication equipment according to claim 4, further comprising:
   a system switching unit for switching a connecting destination of the first antenna element to one of the first signal processing unit and the second signal processing unit, and
   wherein the diversity by the first antenna element and the second antenna element is performed, and
   wherein when the system judging unit detects an idle period of the first communication system, the system judging unit outputs a instruction to the system switching unit, which changes the connecting destination of the first antenna element to the second signal processing unit, and also judges whether to switch to the second communication system based on the output signal from the second signal processing unit.

6. The wireless communication equipment according to claim 5,
wherein the system judging unit prohibits the first signal processing unit from performing communication after the system judging unit detects the idle period and instructs the system switching unit to change to the second signal processing unit until finishing the judgment of whether to switch to the second communication system.

7. The wireless communication equipment according to claim 6, further comprising:
a synchronous timing detecting unit for detecting a timing when the first signal processing unit and the second signal processing unit are synchronized, and
wherein the system judging unit, when switching from the first communication system to the second communication system, outputs an instruction to the system switching unit, which changes the connecting destination of the first antenna element to the first signal processing unit at the timing when not performing the communication for establishing a wireless link using the second communication system, until the synchronous timing detecting unit detects the timing when receiving a notification informing the establishment of the wireless link from a base station using the second communication system to perform the communication by the diversity using the first communication system.

8. The wireless communication equipment according to claim 7,
wherein when the second communication system is the W-CDMA system, the system judging unit prohibits the first signal processing unit from performing communication during a cell search period for establishing the wireless link by the second signal processing unit.

9. The wireless communication equipment according to claim 5, further comprising:
a display unit for displaying receiving statuses of the first communication system and the second communication system by the system judging unit; and
a user input unit by which a user can operate power supplies of the first signal processing unit and the second signal processing unit depending on the receiving statuses.

10. A wireless communication method, comprising:
a step of performing a diversity in a first communication system using a first antenna element and a second antenna element;
a step of monitoring a receiving status in a second communication system by the first antenna element during an idle period of the first communication system;
a step of, during the idle period, monitoring a receiving status in the first communication system by the second antenna element at the same time as monitoring the receiving status in the second communication system; and
a step of finishing use of the first communication system and switching to the second communication system when detecting that the receiving status in the second communication system, is better than the receiving status in the first communication system.

11. The wireless communication method according to claim 10, further comprising:
a step of monitoring the receiving status in the first communication system by the second antenna element at the same time, after switching to the communication in the second communication system.

12. The wireless communication method according to claim 10,
wherein the first communication system is a system for performing the diversity by plural antenna elements including a PDC system, and
wherein the second communication system is a system for not performing the diversity by plural antenna elements including a W-CDMA system or a GSM system.

13. The wireless communication method according to claim 12,
wherein the receiving status is the reception signal strength, BER (Bit Error Rate), a throughput, SNR (Signal to Noise Ratio) or CNR (Carrier to Noise Ratio).

14. The wireless communication method according to claim 12, further comprising:
a step of prohibiting the communication in the first communication system when performing the communication in the second communication system during the idle period of the first communication system.

15. The wireless communication method according to claim 12, further comprising:
a step of prohibiting the communication in the first communication system in a cell search period when monitoring the receiving status in the second communication system which is the W-CDMA system.

16. The wireless communication method according to claim 15, further comprising:
a step of detecting the idle period of the first communication system and transmitting a RACH (Random Access Channel) in the second communication system to a base station; and
a step of interrupting the monitor for the second communication system and returning to the first communication system after the response time with respect to the RACH from the base station, and
wherein these steps are repeated until receiving an AI (Acquisition Indicator) from the base station.

* * * * *